(12) United States Patent
Bulgrien

(10) Patent No.: US 10,927,926 B2
(45) Date of Patent: Feb. 23, 2021

(54) SYSTEMS AND METHODS FOR A TRANSMISSION HAVING A MULTI-SPEED RANGE SECTION

(71) Applicant: CNH Industrial America LLC, New Holland, PA (US)

(72) Inventor: Garth Bulgrien, Ephrata, PA (US)

(73) Assignee: CNH Industrial America LLC, New Holland, PA (US)

(*) Notice: Subject to any disclaimer, the term of this patent is extended or adjusted under 35 U.S.C. 154(b) by 755 days.

(21) Appl. No.: 15/683,476

(22) Filed: Aug. 22, 2017

(65) Prior Publication Data

US 2019/0063556 A1 Feb. 28, 2019

(51) Int. Cl.

| F16H 3/093 | (2006.01) |
|---|---|
| F16H 3/08 | (2006.01) |
| F16H 3/66 | (2006.01) |
| F16H 3/00 | (2006.01) |
| F16H 59/08 | (2006.01) |
| F16H 37/04 | (2006.01) |

(52) U.S. Cl.
CPC ............. *F16H 3/093* (2013.01); *F16H 3/006* (2013.01); *F16H 3/66* (2013.01); *F16H 59/08* (2013.01); *F16H 2003/0818* (2013.01); *F16H 2003/0936* (2013.01); *F16H 2037/045* (2013.01); *F16H 2200/0078* (2013.01); *F16H 2200/0082* (2013.01); *F16H 2200/2058* (2013.01)

(58) Field of Classification Search
CPC ............. F16H 3/097; F16H 2003/0803; F16H 2003/0933

USPC .......................................... 74/330, 331, 335
See application file for complete search history.

(56) References Cited

U.S. PATENT DOCUMENTS

| 4,132,133 A | 1/1979 | Ballendux |
|---|---|---|
| 4,856,355 A | 8/1989 | Ishimaru |
| 4,877,116 A | 10/1989 | Horsch |
| 5,063,793 A | 11/1991 | McAskill |
| 5,117,702 A | 6/1992 | Rodeghiero et al. |
| 5,353,662 A | 10/1994 | Vaughters |
| 5,651,289 A | 7/1997 | Asada et al. |
| 6,336,372 B1 * | 1/2002 | Ogami .................... F16H 61/32 74/335 |
| 6,446,521 B1 | 9/2002 | Hama et al. |

(Continued)

FOREIGN PATENT DOCUMENTS

JP H0366975 3/1991

*Primary Examiner* — Ha Dinh Ho
(74) *Attorney, Agent, or Firm* — Rickard K. DeMille; Rebecca L. Henkel

(57) ABSTRACT

A transmission system configured to transfer power from a power source to a load is provided. The transmission system includes an input section coupled to the power source and a range section coupled to the load. The input section includes a plurality of input clutches configured to selectively transition between engaged and disengaged states to provide one or more input speeds. The range section includes a plurality of range clutches configured to be selectively transition between engaged and disengaged states to provide one or more speed ranges. When the range section is commanded to sequentially shift between two of the one or more speed ranges, the range section is configured to maintain at least two of the plurality of range clutches in the engaged state and transition a maximum of one of the plurality of range clutches from the disengaged state to the engaged state.

20 Claims, 12 Drawing Sheets

(56) References Cited

U.S. PATENT DOCUMENTS

| | | | |
|---|---|---|---|
| 6,845,682 B1* | 1/2005 | Bulgrien | F16H 3/66 475/219 |
| 7,243,565 B2* | 7/2007 | Soeda | F16H 3/006 74/329 |
| 7,258,032 B2* | 8/2007 | Kim | F16H 3/006 74/330 |
| 7,552,658 B2 | 6/2009 | Forsyth | |
| 7,811,192 B2 | 10/2010 | Hong | |
| 7,905,811 B2 | 3/2011 | Asada | |
| 7,958,798 B2 | 6/2011 | Hasegawa | |
| 9,382,975 B2 | 7/2016 | Robinette | |
| 2002/0092372 A1* | 7/2002 | Bowen | F16H 3/091 74/339 |
| 2003/0226416 A1* | 12/2003 | Umemoto | B60W 10/02 74/335 |

* cited by examiner

| | | CLUTCHES | | | | | | | | | | |
|---|---|---|---|---|---|---|---|---|---|---|---|---|
| | | INPUT SECTION | | | | RANGE SECTION | | | | | | |
| SPEED | RANGE | 110 | 114 | 210 | 214 | 310 | 314 | 410 | 510 | 514 | 610 | 614 |
| 1 | 1 | | X | | | | X | | X | | X | |
| 2 | 1 | | | X | | | X | | X | | X | |
| 3 | 1 | | | | X | | X | | X | | X | |
| 4 | 2 | | X | | | | X | | | X | X | |
| 5 | 2 | | | X | | | X | | | X | X | |
| 6 | 2 | | | | X | | X | | | X | X | |
| 7 | 3 | | X | | | | X | X | | | X | |
| 8 | 3 | | | X | | | X | X | | | X | |
| 9 | 3 | | | | X | | X | X | | | X | |
| 10 | 4 | | X | | | X | O | | | | X | |
| 11 | 4 | | | X | | X | O | | | | X | |
| 12 | 4 | | | | X | X | O | | | | X | |
| 13 | 5 | | X | | | O | X | | | | | X |
| 14 | 5 | | | X | | O | X | | | | | X |
| 15 | 5 | | | | X | O | X | | | | | X |
| 16 | 6 | | X | | | X | | X | | | | X |
| 17 | 6 | | | X | | X | | X | | | | X |
| 18 | 6 | | | | X | X | | X | | | | X |
| 19 | 7 | | X | | | X | | | | X | | X |
| 20 | 7 | | | X | | X | | | | X | | X |
| 21 | 7 | | | | X | X | | | | X | | X |
| 22 | 8 | | X | | | X | | | X | | | X |
| 23 | 8 | | | X | | X | | | X | | | X |
| 24 | 8 | | | | X | X | | | X | | | X |
| R1 | 1 | X | | | | | X | | X | | X | |
| R2 | 2 | X | | | | | X | | | X | X | |
| R3 | 3 | X | | | | | X | X | | | X | |
| R4 | 4 | X | | | | X | O | | | | X | |
| R5 | 5 | X | | | | O | X | | | | | X |
| R6 | 6 | X | | | | X | | X | | | | X |
| R7 | 7 | X | | | | X | | | | X | | X |
| R8 | 8 | X | | | | X | | | X | | | X |

FIG. 4

SYSTEMS AND METHODS FOR A TRANSMISSION HAVING A MULTI-SPEED RANGE SECTION

CROSS REFERENCE TO RELATED APPLICATION

Not applicable.

FIELD OF THE INVENTION

The present invention relates generally to transmission systems for a work vehicle and, more specifically, to a transmission system including a multi-speed range section that is configured to provide good shiftability.

BACKGROUND OF THE INVENTION

Transmissions are used in off-highway vehicles to transmit power from a power source to equipment for accomplishing a desired task. For example, if an off-highway vehicle is configured to travel, a transmission may be implemented to transmit power from a power source (e.g., an internal combustion engine, an electric motor, etc.) to wheels of the vehicle.

In some instances, off-high vehicles utilize a powershift transmission. A powershift transmission may be configured to control the application and release of multiple clutches to maintain a torque path through the transmission while switching between gears. Current demands for increased power and speed range inherently add complexity and space requirements for powershift transmissions and potentially reduce the efficiency thereof. For example, to accommodate a need for an increased speed range, a large number of speeds may be required by a powershift transmission. This large number of speeds may require a powershift transmission to include shifts that have a large number (e.g., two or more) clutch changes, or swaps, that occur during the shift. In addition, some shifts may require a large gear ratio difference associated with each clutch swap. Both the number of clutches changed and the gear ratio difference may relate to the shiftability (i.e., the operator comfort associated with how smoothly a given transmission shift occurs) defined by a given powershift transmission.

SUMMARY OF THE INVENTION

Some embodiments of the invention provide a transmission system configured to transfer power from a power source to a load on an off-highway vehicle. The transmission system includes an input section and a range section. The input section includes an input shaft coupled to the power source to transfer power therebetween and a plurality of input clutches configured to selectively transition between an engaged state and a disengaged state to provide one or more input speeds. The range section includes an output shaft coupled to the load to transfer power therebetween and a plurality of range clutches configured to selectively transition between an engaged state and a disengaged state to provide one or more speed ranges for each of the one or more input speeds provided by the input section. When the range section is commanded to sequentially shift between two of the one or more speed ranges at a given one of the one or more input speeds, the range section is configured to maintain at least two of the plurality of range clutches in the engaged state and transition a maximum of one of the plurality of range clutches from the disengaged state to the engaged state.

Some embodiments of the invention provide a transmission system configured to transfer power from a power source to a load on an off-highway vehicle. The transmission system includes an input section and a range section. The input section includes an input shaft coupled to the power source to transfer power therebetween and a plurality of input clutches configured to selectively transition between an engaged state and a disengaged state to provide one or more input speeds. The range section includes an output shaft coupled to the load to transfer power therebetween and a plurality of range clutches configured to selectively transition between an engaged state and a disengaged state to provide one or more speed ranges for each of the one or more input speeds provided by the input section. Each of the one or more speed ranges provided by the range section include three of the plurality of range clutches in the engaged state. When the range section is commanded to sequentially shift between two of the one or more speed ranges at a given one of the one or more input speeds, two of the plurality of clutches are maintained in the engaged state.

Some embodiments of the invention provide a range section for a transmission. The range section includes a range input shaft, a range output shaft, at least two range countershafts configured to transfer power between the range input shaft and the range output shaft, and a plurality of range clutches. The plurality of range clutches are configured to selectively transition between an engaged state and a disengaged state to provide one or more speed ranges. The plurality of range clutches includes a first countershaft clutch and a second countershaft clutch, and the one or more speed ranges includes a lowest speed range, a second lowest speed range, a highest speed range, and a second highest speed range. Each of the one or more speed ranges include three of the plurality of range clutches in the engaged state. In response to a command to sequentially shift between two of the one or more speed ranges, two of the plurality of clutches are maintained in the engaged state and one of the plurality of clutches is transitioned from the disengaged state to the engaged state. In response to a command to shift from the lowest speed range to the second lowest speed range, the first countershaft clutch is disengaged and the second countershaft clutch is engaged. In response to a command to shift from the highest speed range to the second highest speed range, the first countershaft clutch is disengaged and the second countershaft clutch is engaged.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 4 illustrates a shift diagram corresponding to gear ratio changes on the transmission of FIG. 3;

DETAILED DESCRIPTION OF THE INVENTION

Figure 1:
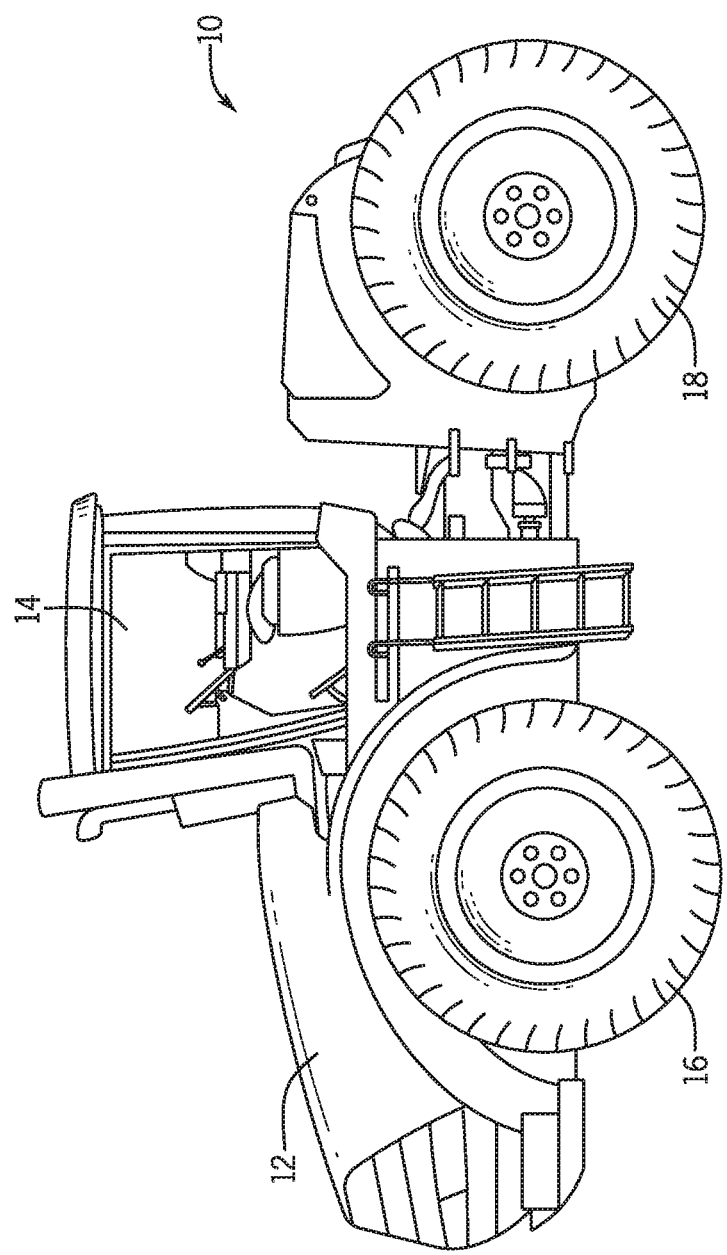
FIG. 1 is a side view of an embodiment of an off-highway vehicle that may employ a transmission system, in accordance with an embodiment of present invention.

FIG. 1 is a side view of a work, or off-highway, vehicle 10 that may employ a transmission system according to one embodiment of the present invention. The work vehicle 10 may be any suitable type of loader, tractor, grader, backhoe, forklift, agricultural vehicle, or any other suitable vehicle that utilizes a transmission. The work vehicle 10 includes a body 12, a cabin 14, one or more front wheels 16 and one or more rear wheels 18. The body 12, for example, typically houses at least an engine, or power source, a transmission, and a power train. An operator may sit or stand in the cabin 14 to operate the work vehicle 10 via, for example, one or more pedals, levers, joysticks, etc. In the illustrated embodiment, the work vehicle 10 includes two front wheels or tracks 16 and two rear wheels or tracks 18 that rotate to move the work vehicle 10. The work vehicle 10 may drive the wheels 16 and 18 using power transferred thereto by the transmission from the power source. In one embodiment, for example, the work vehicle 10 may use a powershift transmission system to transfer power from the engine to the wheels 16 and 18. In other embodiments, for example, the work vehicle 10 may use a powershift transmission to drive other components (e.g., a hydraulic pump, tracks, etc.) to perform other vehicle operations.

Figure 2:
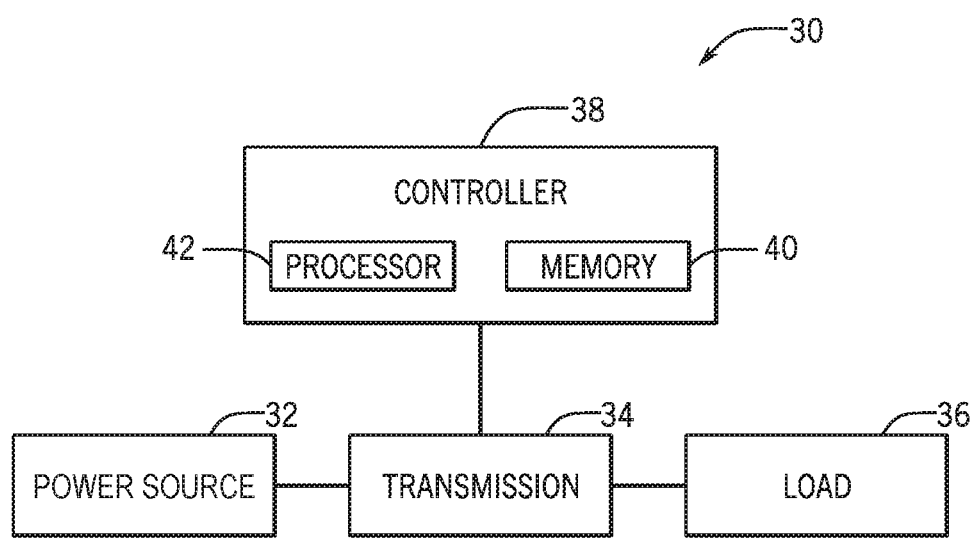
FIG. 2 is a block diagram of an embodiment of a transmission system that may be used in the off-highway vehicle of FIG. 1, in accordance with an embodiment of present invention.

FIG. 2 is a block diagram of an embodiment of a transmission system 30 that may be configured to be integrated into the work vehicle 10. The transmission system 30 may include a power source 32, a transmission 34, a load 36, and a controller 38 in communication with the transmission 34. The power source 32 (e.g., an internal combustion engine) provides power to drive the transmission 34 of the transmission system 30. The transmission 34 may include a hydraulic system, a planetary gear unit, seals and gaskets, a torque converter, a modulator, and sensor(s), etc. Output from the transmission 34 drives a load 36, such as the wheels 16 and 18 of the work vehicle 10. The controller 38 may be configured to control various systems and units within the transmission 34. In the illustrated embodiment, the controller 38 includes one or more memory device(s) 40 and one or more processor(s) 42. The memory device(s) 40 may store one or more sets of instructions (e.g., processor-executable instructions) implemented to operate the transmission 34. In operation, the controller 38 may use the processor(s) 42 to execute instructions stored in the memory device(s) 40 to control the transmission 34. For example, the controller 38 may receive instructions to cause various clutches to be engaged/disengaged to cause gear ratio changes while the work vehicle 10 is moving (e.g., at different speeds).

Figure 3:
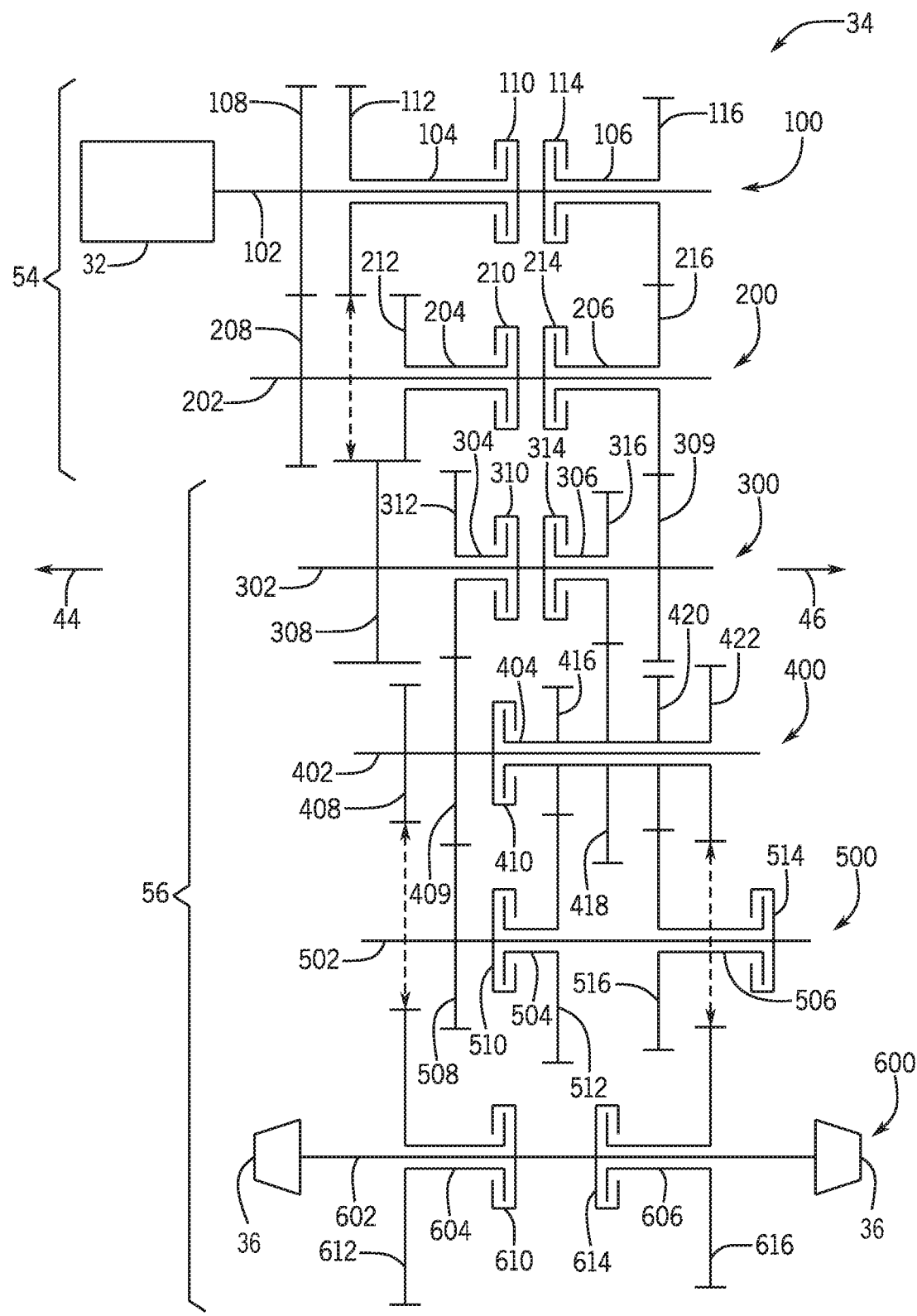
FIG. 3 is a schematic illustration of an embodiment of a transmission that may be used within the transmission system of FIG. 2.

FIG. 3 is a schematic illustration of an embodiment of a transmission 34 that may be used within the transmission system of FIG. 2. In the description herein, an axial direction 44 (i.e., a lateral direction along which one or more shafts in the transmission are oriented) pointing in a general leftward direction (from the perspective of FIG. 3) is referred to herein as "front." An opposing axial direction 46 pointing in a general rightward direction (from the perspective of FIG. 3) is referred to herein as "rear."

In general, the transmission 34 is configured to transfer power from the power source 32 to the load 36 through one or more sections. In the illustrated embodiment, the transmission 34 includes an input section 54 and a range section 56. In some embodiments, for example, the input section 54 includes at least one shaft arrangement having an input shaft that is coupled to the power source 32. For example, the input section 54 may include a first shaft arrangement having an input shaft coupled to the power source 52 and a second shaft arrangement, where at least one of the first shaft arrangement and the second shaft arrangement are configured to transfer power to the range section 56. In some embodiments, the input sections 54 may include a plurality of input clutches that may be selectively changed between engaged/disengaged states to provide one or more input speeds to the range section 56. For example, the input section 54 may be configured to provide three input speeds for a forward direction of travel and one input speed in a reverse direction of travel.

In some embodiments, for example, the range section 56 includes at least one shaft arrangement having an output shaft that is configured to transfer power, which is transferred from the input section 54 and through the range section 56, to the load 36. For example, the range section 56 may include a third shaft arrangement, a fourth shaft arrangement, a fifth shaft arrangement, and a sixth shaft arrangement, where at least one of the third, fourth, fifth and sixth shaft arrangements are coupled to the input section 54 to transfer power therebetween and another of the third, fourth, fifth, and sixth arrangements include an output shaft configured to transfer power to the load. In some embodiments, for example, the third, fourth, fifth, and sixth shaft arrangements may comprise a range input shaft, a range output shaft, at least two countershafts configured to transfer power between the range input shaft and the range output shaft, and a plurality of range clutches.

In some embodiments, for example, the range section 56 may include a plurality of range clutches that may be selectively changed between engaged/disengaged states to provide one or more speed ranges for the input speed provided by the input section 54. For example, the range section 56 may be configured to provide eight speed ranges for each of the input speeds and directions provided by the input section 56. In some embodiments, for example, the range section 56 may be configured to limit an amount of clutches changed between an engaged/disengaged state while shifting between sequential speed ranges for a given input speed from the input section 54. For example, the range section 56 may include a plurality of range clutches and, when the range section 56 is commanded (e.g., via the controller 38) to sequentially shift between two of the speed ranges at a given input speed, the range section 56 may be configured to maintain at least two of the plurality of clutches in an engaged state and transition a maximum of one clutch from a disengaged state to an engaged state. In some embodiments, each of the speed ranges provided by the range section 56 include three of the plurality of range clutches in the engaged state to provide a given speed range. When the range section 56 is commanded (e.g., via the controller 38) to sequentially shift between two of the speed ranges at a given input speed, the range section 56 may be configured to maintain two of the plurality of range clutches in an engaged state during the sequential speed range shift and a maximum of one of the plurality of range clutches may transition from the disengaged state to the engaged state.

In some embodiments, for example, the range section 56 may be configured to transition at least two of the plurality of clutches between similar states when switching between two different sets of range speeds, but with power flowing through the at least two of the plurality of clutches in opposing directions. For example, the plurality of clutches may include a first countershaft clutch and a second countershaft clutch and the one or more speed ranges may include a lowest speed range, a second lowest speed range, a highest speed range, and a second highest speed range. In response to a command (e.g., via the controller 38) to shift from the lowest speed range to the second lowest speed range, the first countershaft clutch is disengaged and the second countershaft clutch is engaged. Similarly, in response to a command to shift from the highest speed range to the second highest speed range, the first countershaft clutch is disengaged and the second countershaft clutch is engaged. In some embodiments, for example, this functionality achieved by the range section 56 may be enabled by power flowing therethrough in opposing directions. For example, in the lowest speed, power may be configured to flow through the first countershaft clutch in a first direction and, in the highest speed, power may be configured to flow through the first countershaft clutch in a second direction opposite to the first direction.

In the illustrated embodiment of FIG. 3, the input section 54 includes a first shaft arrangement 100 and a second shaft arrangement 200. The range section 56 includes a third shaft arrangement 300, a fourth shaft arrangement 400, a fifth shaft arrangement 500, and a sixth shaft arrangement 600.

The first shaft arrangement 100 includes an input shaft or input shaft 102, a front outer shaft 104, and a rear outer shaft 106. The input shaft 102 is configured to be coupled to the power source 34 to receive input power therefrom and fixedly coupled to a first gear 108, such that rotation of the input shaft 102 rotates the first gear 108, and vice versa. In some embodiments, for example, the power source 34 may include a drive shaft or crank shaft that is rotationally coupled to the input shaft 102 for rotation therewith.

The front outer shaft 104 is coaxially disposed around the input shaft 102, such that the front outer shaft 104 partially envelops a length of the input shaft 102. The front outer shaft 104 can be selectively engaged with the input shaft 102, such that the input shaft 102 is rotationally fixed to the front outer shaft 104, using a front clutch 110. The front outer shaft 104 is further fixedly coupled to a front outer gear 112, such that rotation of the front outer shaft 104 rotates the front outer gear 112, and vice versa.

The rear outer shaft 106 is coaxially disposed around the input shaft 102, rearward of the front outer shaft 104, such that the rear outer shaft 106 partially envelops a length of the input shaft 102. The rear outer shaft 106 can be selectively engaged with the input shaft 102, such that the input shaft 102 is rotationally fixed to the rear outer shaft 106, using a rear clutch 114. The rear outer shaft 106 is further fixedly coupled to a rear outer gear 116, such that rotation of the rear outer shaft 106 rotates the rear outer gear 116, and vice versa.

The second shaft arrangement 200 includes a second shaft 202, a front outer shaft 204, and a rear outer shaft 206. The second shaft 202 is fixedly coupled to a second gear 208, such that rotation of the second shaft 202 rotates the second gear 208, and vice versa. The second gear 208 is further rotationally engaged with the first gear 108 of the first shaft arrangement 100. As such, rotation of the input shaft 102 results in a rotation of the second shaft 202, and vice versa.

The front outer shaft 204 is coaxially disposed around the second shaft 202, such that the front outer shaft 204 partially envelops a length of the second shaft 202. The front outer shaft 204 can be selectively engaged with the second shaft 202, such that the second shaft 202 can be rotationally fixed to the front outer shaft 204, using a front clutch 210. The front outer shaft 204 is further fixedly coupled to a front outer gear 212, such that rotation of the front outer shaft 204 rotates the front outer gear 212, and vice versa.

The rear outer shaft 206 is coaxially disposed around the second shaft 202, rearward of the front outer shaft 204, such that the rear outer shaft 206 partially envelops a length of the second shaft 202. Similarly, the rear outer shaft 206 can be selectively engaged with the second shaft 202 using a rear clutch 214. The rear outer shaft 206 is further fixedly coupled to a rear outer gear 216, such that rotation of the rear outer shaft 206 rotates the rear outer gear 216, and vice versa. The rear outer gear 216 is further rotationally engaged with the rear outer gear 116 of the first shaft arrangement 100. As such, rotation of the rear outer shaft 106 results in rotation of the rear outer shaft 206, and vice versa.

The third shaft arrangement 300 includes a third shaft 302, a front outer shaft 304, and a rear outer shaft 306. The third shaft 302 is fixedly coupled to a front third gear 308, such that rotation of the third shaft 302 rotates the front third gear 308, and vice versa. The front third gear 308 is further rotationally engaged with both the front outer gear 112 of the first shaft arrangement 100 (illustrated with a dashed line) and the front outer gear 212 of the second shaft arrangement 200. As such, rotation of either of the front outer shaft 104 of the first shaft arrangement 100 or the front outer shaft 204 of the second shaft arrangement 200 results in rotation of the third shaft 302. Conversely, rotation of the third shaft 302 rotates each of the front outer shaft 104 of the first shaft arrangement 100 and the front outer shaft 204 of the second shaft arrangement 200. The third shaft 302 is further fixedly coupled to a rear third gear 309, such that rotation of the third shaft 302 rotates the rear third gear 309, and vice versa. The rear third gear 309 is further rotationally engaged with the rear outer gear 216 of the second shaft arrangement 200. As such, rotation of the rear outer shaft 206 results in rotation of the third shaft 302, and vice versa.

The front outer shaft 304 is coaxially disposed around the third shaft 302, such that the front outer shaft 304 partially envelops a length of the third shaft 302. The front outer shaft 304 can be selectively engaged with the third shaft 302, such that the third shaft 302 can be rotationally fixed to the front outer shaft 304, using a front clutch 310. The front outer shaft 304 is further fixedly coupled to a front outer gear 312, such that rotation of the front outer shaft 304 rotates the front outer gear 312, and vice versa.

The rear outer shaft 306 is coaxially disposed around the third shaft 302, rearward of the front outer shaft 304, such that the rear outer shaft 306 partially envelops a length of the third shaft 302. Similarly, the rear outer shaft 306 can be selectively engaged with the third shaft 302 using a rear clutch 314. The rear outer shaft 306 is further fixedly coupled to a rear outer gear 316, such that rotation of the rear outer shaft 306 rotates the rear outer gear 316, and vice versa.

The fourth shaft arrangement 400 includes a fourth shaft 402 and an outer shaft 404. The fourth shaft 402 is fixedly coupled to a front fourth gear 408, such that rotation of the fourth shaft 402 rotates the front fourth gear 408, and vice versa. The fourth shaft 402 is further fixedly coupled to a rear fourth gear 409, such that rotation of the fourth shaft 402 rotates the rear fourth gear 409, and vice versa. The rear fourth gear 409 is further rotationally engaged with the front outer gear 312 of the third shaft arrangement 300. As such, rotation of the rear outer shaft 306 rotates the fourth shaft 402, and vice versa.

The outer shaft 404 is coaxially disposed around the fourth shaft 402, such that the outer shaft 404 partially envelops a length of the fourth shaft 402. The outer shaft 404 can be selectively engaged with the fourth shaft 402, such that the fourth shaft 402 can be rotationally fixed to the outer shaft 404, using a clutch 410. The outer shaft 404 is further fixedly coupled to a front outer gear 416, a front middle outer gear 418, a rear middle outer gear 420, and a rear outer gear 422, such that rotation of the outer shaft 404 rotates every one of the fixedly coupled gears 416, 418, 420, 422, and conversely, rotation of any one of the fixedly coupled gears 416, 418, 420, 422 rotates the outer shaft 404. The front middle outer gear 418 is further rotationally engaged with the rear outer gear 316 of the third shaft arrangement 300, such that rotation of the rear outer shaft 306 rotates the outer shaft 404, and vice versa.

The fifth shaft arrangement 500 includes a fifth shaft 502, a front outer shaft 504, and a rear outer shaft 506. The fifth shaft 502 is fixedly coupled to a fifth gear 508, such that rotation of the fifth shaft 502 rotates the fifth gear 508, and vice versa. The fifth gear 508 is further rotationally engaged with the rear fourth gear 409 of the fourth shaft arrangement 400, such that rotation of the fourth shaft 402 rotates the fifth shaft 502, and vice versa.

The front outer shaft 504 is coaxially disposed around the fifth shaft 502, such that the front outer shaft 504 partially envelops a length of the fifth shaft 502. The front outer shaft 504 can be selectively engaged with the fifth shaft 502, such that the fifth shaft 502 can be rotationally fixed to the front outer shaft 504, using a front clutch 510. The front outer shaft 504 is further fixedly coupled to a front outer gear 512, such that rotation of the front outer shaft 504 rotates the front outer gear 512, and vice versa. The front outer gear 512 is further rotationally engaged with the front outer gear 416 of the fourth shaft arrangement 400, such that rotation of the outer shaft 404 rotates the front outer shaft 504, and vice versa.

The rear outer shaft 506 is coaxially disposed around the fifth shaft 502, rearward of the front outer shaft 504, such that the rear outer shaft 506 partially envelops a length of the fifth shaft 502. Similarly, the rear outer shaft 506 can be selectively engaged with the fifth shaft 502 using a rear clutch 514. The rear outer shaft 506 is further fixedly coupled to a rear outer gear 516, such that rotation of the rear outer shaft 506 rotates the rear outer gear 516, and vice versa. The rear outer gear 516 is further rotationally engaged with the rear middle outer gear 420 of the fourth shaft arrangement 400, such that rotation of the outer shaft 404 rotates the rear outer shaft 506, and vice versa.

The sixth shaft arrangement 600 includes an output shaft or output shaft 602, a front outer shaft 604, and a rear outer shaft 606. The output shaft 602 is rotationally coupled to the load 36 such that rotational power can be transmitted to the load 36 from the output shaft 602.

The front outer shaft 604 is coaxially disposed around the output shaft 602, such that the front outer shaft 604 partially envelops a length of the output shaft 602. The front outer shaft 604 can be selectively engaged with the output shaft 602, such that the output shaft 602 can be rotationally fixed to the front outer shaft 604, using a front clutch 610. The front outer shaft 604 is further fixedly coupled to a front outer gear 612, such that rotation of the front outer shaft 604 rotates the front outer gear 612, and vice versa. The front outer gear 612 is further rotationally engaged with the front fourth gear 408 of the fourth shaft arrangement 400 (illustrated with a dashed line), such that rotation of the fourth shaft 402 rotates the front outer shaft 604, and vice versa.

The rear outer shaft 606 is coaxially disposed around the output shaft 602, rearward of the front outer shaft 604, such that the rear outer shaft 606 partially envelops a length of the output shaft 602. Similarly, the rear outer shaft 606 can be selectively engaged with the output shaft 602 using a rear clutch 614. The rear outer shaft 606 is further fixedly coupled to a rear outer gear 616, such that rotation of the rear outer shaft 606 rotates the rear outer gear 616, and vice versa. The rear outer gear 616 is further rotationally engaged with the rear outer gear 422 of the fourth shaft arrangement 400 (illustrated with a dashed line), such that rotation of the outer shaft 404 rotates the rear outer shaft 606, and vice versa.

In some embodiments, for example, the third shaft 302, the fourth shaft 402, the fifth shaft 502, and the sixth shaft 602 may be arranged in a parallel, non-concentric arrangement. That is, each of the third shaft 302, the fourth shaft 402, the fifth shaft 502, and the sixth shaft 602 is arranged parallel to one another and none of the third shaft 302, the fourth shaft 402, the fifth shaft 502, and the sixth shaft 602 are arranged concentrically with respect to one another.

The clutches described herein may be any suitable type(s), including dry clutch(es), wet clutch(es), single/multi plate clutch(es), dog clutch(es), centrifugal clutch(es), pneumatic and hydraulic clutch(es), electromagnetic clutch, or any combination thereof, among other types of clutches. Furthermore, each of the clutches may be configured to selectively couple a gear to a shaft or selectively couple a shaft to another shaft upon receiving a control signal from the controller 38. The described system of gears and shafts can be actuated with the eleven clutches (110, 114, 210, 214, 310, 314, 410, 510, 514, 610, and 614) to achieve different gear ratios (e.g., speeds) between the input shaft 102 and the output shaft 602. For example, the clutches may be controlled (e.g., via the controller 38) to control the engagement/disengagement of each clutch with its respective gear(s) and/or shaft(s) to transfer power along different power flow paths to achieve different speeds, as discussed in detail below.

FIG. 4 is a shift diagram corresponding to gear ratio changes of the transmission 34 of FIG. 3. As illustrated in FIG. 4, in some embodiments, the transmission 34 may be configured to provide twenty-four forward speeds from Speed 1 to Speed 24 and eight reverse speeds from Speed R1 to Speed R8, in ranges from Range 1 to Range 8. The Speeds 1 to 24 and the Speeds R1 to R8 are illustrated in successive, or sequential, rows with each speed achievable via a respective power flow path through the transmission 34 of FIG. 3. For example, Speed 1 may be achieved by engaging clutches 114, 314, 510, and 610, each of which are designated by "X" within the shift diagram. Similarly, for example, Speed 2 may be achieved by engaging clutches 210, 314, 510, and 610, and so on with the engaged clutches being designated with an "X" and the disengaged clutches having no "X."

In some instances, various clutches may be inconsequential to the power flow path (i.e., their state of engagement does not affect the flow of power through the transmission 34), which can, for example, be due to the state of engagement of other clutches within the transmission 34. As such, their engagement may be optional within a specific range. These clutches are designated by "O," which signifies their engagement as optional within the given range. For example, Speed 10 may be achieved by engaging clutches 114, 310, and 610, and clutch 314 can be engaged or disengaged, as desired, without affecting the overall power flow path.

Throughout the discussion of the various power flow paths described below, it should be appreciated that, while power is driven from the drive motor 50, through the input section 54, through the range section 56, and into the load, the input section 54 and the range section 56 can be independently shifted to achieve various input speed shifts and range shifts, respectively. Specifically, the input section 54 can provide three individual forward input speeds and one reverse input speed within each of the eight ranges, Range 1 through Range 8, thereby providing the twenty-four overall forward speeds and the eight overall reverse speeds.

Furthermore, the gears in the transmission 34 are arranged such that when sequential power shifts are performed from Speed 1 to Speed 24, the total gear ratio of the transmission 34 decreases. Similarly, the gears in the transmission 34 are arranged such that when sequential power shift are performed from Speed R1 to R8, the total gear ratio of the transmission 34 decreases.

As each of the Speeds 1 to 24 is discussed below, it should be noted that the clutches and gears of the range section 56 are arranged such that three (or in some instances two) clutches are engaged to complete a power flow path through the range section 56, but two of these three clutches remain engaged when shifting between sequential speed ranges (e.g., from Range 1 to Range 2, Range 2 to Range 3, etc.). In other words, the transmission 34 can be shifted between adjacent ranges using single-clutch swaps in the range section 56. For example, when a shift is performed to engage the clutches in the range section 56 going from Range 1 to Range 2 (e.g., Speed 3 to Speed 4), both clutches 314 and 610 remain engaged, and only a single swap takes place by disengaging clutch 510 and engaging clutch 514.

Thus, the range section 56 is configured to limit the amount of range clutches (i.e., the clutches disposed within the range section 56 of the transmission 34) changed between an engaged/disengages state during shifts between sequential ranges (e.g., a maximum of one of the plurality of range clutches transitions from the disengaged state to the engaged state and a maximum of one of the plurality of range clutches transitions from the engaged state to the disengaged state). These characteristics of the transmission 34 may enhance shiftability and thereby enhance operator comfort and transmission efficiency.

It should be noted that, while only a single-clutch swap takes place within the range section 56 when switching between adjacent ranges, another single-clutch swap may occur within the input section 54. For example, when shifting from Speed 3 in Range 1 to Speed 4 in Range 2, the rear clutch 114 is engaged and the rear clutch 214 is disengaged within the input section 54. As such, sequential shifts from one range section to the next may be achieved with double-clutch swaps throughout the whole transmission 34. However, due to the large number of ranges provided by the range section 56 (i.e., eight when compared to a typical two or three on current transmissions), the gear ratio changes involved during these double-clutch swaps that occur for shifts that change input speed from the input section 54 and sequentially change speed range in the range section 56 are very small.

For example, if the disclosed transmission (e.g., the transmission 34) includes gear ratios that provide a 15% step between sequential range speeds (e.g., an upshift to a sequentially adjacent forward speed results in a 15% increase in output speed) and includes three input speeds and eight range speeds, a downshift requiring a speed range change (e.g., changing from Range 2 to Range 1) requires shifting the input section 54 up two steps (i.e., from a first forward input speed to a third forward input speed). Because the second forward input speed is 15% higher than the first forward input speed, and the third forward input speed is 15% higher than the second forward input speed, the third forward input speed is 32.25% higher than the first forward input speed (e.g., $1.15^1-1=32.25\%$). As such, when the range section 56 switches down to an adjacent range, the output speed provided by the input section 54 has to provide an approximately 32.25% higher speed. This increase in speed is directly proportional to the gear ratio change within the transmission 34.

Conversely, to provide twenty-four forward speeds in a conventional transmission with the typical three range speeds, the conventional transmission would have eight input speeds (e.g., 2×4 or 4×2 in two stages) in each range. In this case, when shifting between sequentially adjacent ranges, the input section must traverse seven input speeds. If, for example, the conventional transmission similarly has gear ratios that provide a 15% step between sequentially adjacent speeds, a downshift requiring a range change requires shifting the input section up seven steps. Because each forward input speed is 15% higher than the previous forward input speed, the eighth forward input speed is approximately 166% higher than the first forward input speed ($1.15^1-1=166\%$). Again, this increase in speed is directly proportional to the gear ratio change within the transmission, resulting in a much higher gear ratio change when shifting between adjacent ranges.

Based on the non-limiting example described above, the use of a range section with eight range speeds provides significant advantages over conventional transmissions. That is, the range section 56 is configured to reduce the gear ratio change involved during potential double-clutch swaps (e.g., when a shift requires a change in the range speed). These characteristics of the transmission 34 may further enhance shiftability and thereby enhance operator comfort and transmission efficiency.

Each of the Speeds 1 to 24 in successive rows shown in FIG. 4 represents a power flow path through the transmission 34 of FIG. 3. Below, each of the power flow paths is discussed in detail.

It should be noted that, within the transmission 34, while shifting up gears (e.g., from Speed 1 to Speed 2, from Speed 2 to Speed 3, from Speed 3 to Speed 4, etc.) the clutches of the input section 54 are swapped in a cyclical fashion. That is, for example, in Speed 1, only the rear clutch 114 is engaged, then in Speed 2, only the front clutch 210 is engaged, and then in Speed 3, only the rear clutch 214 is engaged. This pattern of clutch swapping is then repeated, such that, in Speed 4, only the rear clutch 114 is engaged, then in Speed 5, only the front clutch 210 is engaged, and then in Speed 6, only the rear clutch 214 is engaged. As such, for each speed range, the lowest input speed (e.g., Speed 1, Speed 4, Speed 7, Speed 10, etc.) have an identical power flow path within the input section 54, leading to the third shaft 302 of the third shaft arrangement 300, as that of Speed 1, as described above. Similarly, for each speed range, the middle input speed (e.g., Speed 2, Speed 5, Speed 8, Speed 11, etc.) have an identical power flow path within the input section 54, leading to the third shaft 302 of the third shaft arrangement 300, as that of Speed 2, as described above. Similarly, for each range, the highest input speed (e.g., Speed 3, Speed 6, Speed 9, Speed 12, etc.) have an identical power flow path within the input section 54, leading to the third shaft 302 of the third shaft arrangement 300, as that of Speed 3, as described above.

In Speed 1, clutches 114, 314, 510, and 610 are each engaged, with the remaining clutches of the transmission 34 being disengaged. As such, as the input shaft 102 is driven to rotate by the power source 32, the first gear 108 rotates. Because the first gear 108 is rotationally engaged with the second gear 208, the first gear 108 drives the second gear 208, which in turn rotates the second shaft 202. However, because neither of the front clutch 210 nor the rear clutch 214 are engaged, the rotation of the second shaft 202 does not affect the front outer shaft 204 or the rear outer shaft 206, and therefore does not affect the power flow through the transmission 34. Similarly, because the front clutch 110 is not engaged, the rotation of the input shaft 102 does not affect the front outer shaft 104. Conversely, the rear clutch 114 is engaged, and thus the input shaft 102 is rotationally fixed to the rear outer shaft 106. As such, the rear outer shaft 106 rotates the rear outer gear 116.

Because the rear outer gear 116 of the first shaft arrangement 100 is rotationally engaged with the rear outer gear 216 of the second shaft arrangement 200, the rear outer gear 116 drives the rear outer gear 216 to rotate, thereby rotating the rear outer shaft 206. With the rear clutch 214 disengaged, the rear outer shaft 206 is not rotationally fixed to the second shaft 202 and is allowed to rotate freely about the second shaft 202.

The rear outer gear 216 of the second shaft arrangement 200 is rotationally engaged with the rear third gear 309 of the third shaft arrangement 300 and, thereby, drives the rear third gear 309 to rotate, which rotates the third shaft 302. Similarly, because the front clutch 310 is disengaged, the third shaft 302 is not rotationally fixed to the front outer shaft 304, and so rotation of the third shaft 302 does not affect the front outer shaft 304. Conversely, because the rear clutch 314 is engaged, the third shaft 302 is rotationally fixed to the rear outer shaft 306, and as such the third shaft 302 drives the rear outer shaft 306 to rotate, thereby rotating the rear outer gear 316.

The rear outer gear 316 of the third shaft arrangement 300 is rotationally engaged with the front middle outer gear 418 of the fourth shaft arrangement 400 and, thereby, drives the front middle outer gear 418 to rotate, which rotates the outer shaft 404. Again, because the clutch 410 is disengaged, rotation of the outer shaft 404 does not affect the fourth shaft 402. However, the rotation of the outer shaft 404 results in rotation of each of the front outer gear 416, the rear middle outer gear 420, and the rear outer gear 422.

Because the front outer gear 416, the rear middle outer gear 420, and the rear outer gear 422 of the fourth shaft arrangement 400 are rotationally engaged with the front outer gear 512 and the rear outer gear 516 of the fifth shaft arrangement 500, and the rear outer gear 616 of the sixth shaft arrangement 600, respectively, the front outer gear 416, the rear middle outer gear 420, and the rear outer gear 422 drive the front outer gear 512, the rear outer gear 516, and the rear outer gear 616, respectively, to rotate. The rotation of the front outer gear 512, the rear outer gear 516, and the rear outer gear 616 rotates the front outer shaft 504, the rear outer shaft 506, and the rear outer shaft 606, respectively. However, again, because neither the rear clutch 514 nor the rear clutch 614 are engaged, rotation of the rear outer shaft 506 and the rear outer shaft 606 do not affect the fifth shaft 502 and the output shaft or output shaft 602, respectively. Conversely, because the front clutch 510 is engaged, the front outer shaft 504 is rotationally fixed to the fifth shaft 502. As such, the front outer shaft 504 drives the fifth shaft 502 to rotate. The rotation of the fifth shaft 502 then rotates the fifth gear 508.

The fifth gear 508 of the fifth shaft arrangement 500 is rotationally engaged with the rear fourth gear 409 of the fourth shaft arrangement 400 and, thereby, drives the rear fourth gear 409 to rotate. Rotation of the rear fourth gear 409 rotates the fourth shaft 402, which rotates the front fourth gear 408.

Because the front fourth gear 408 of the fourth shaft arrangement 400 is rotationally engaged with the front outer gear 612 of the sixth shaft arrangement 600, the front fourth gear 408 drives the front outer gear 612 to rotate. Rotation of the front outer gear 612 then rotates the front outer shaft 604. With the front clutch 610 engaged, the front outer shaft 604 is rotationally fixed to the output shaft or output shaft 602. As such, the front outer shaft 604 drives the output shaft 602 to rotate. Rotation of the output shaft or output shaft 602 then drives the load 36.

As such, with the transmission 34 in Speed 1, the input section 52 is configured to provide a first forward input speed, such that power is driven from power source 32, through the input shaft or input shaft 102, through the engaged rear clutch 114, through the rear outer shaft 106, through the rear outer gear 116 of the first shaft arrangement 100, and into the rear outer gear 216 of the second shaft arrangement 200. From the rear outer gear 216 of the second shaft arrangement 200, power is driven to the rear third gear 309 of the third shaft arrangement 300, and thereby into the third shaft 302.

Figure 5:
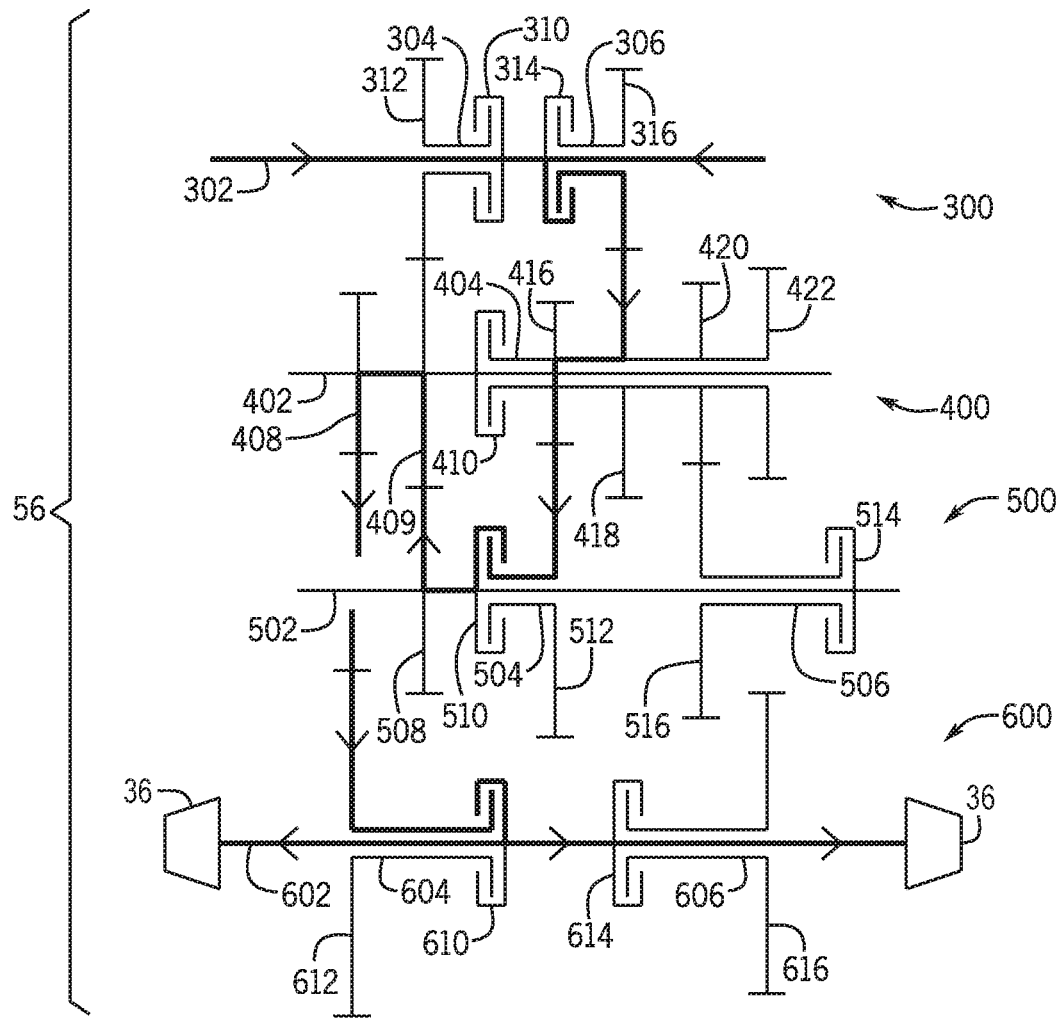
FIG. 5 illustrates a schematic diagram of an embodiment of a range section of the transmission of FIG. 3, showing a power flow path for a first range configuration.

Further, with the transmission 34 in Speed 1, the range section 56 is in Range 1. Range 1 is illustrated in FIG. 5, with the power flow path and directionality of the power flow denoted by a bolded and arrowed line. As such, power is driven from the third shaft 302, through the engaged rear clutch 314, through the rear outer shaft 306, through the rear outer gear 316 of the third shaft arrangement 300, and into the front middle outer gear 418 of the fourth shaft arrangement 400. From the front middle outer gear 418, power is driven through the outer shaft 404, through the front outer gear 416 of the fourth shaft arrangement 400, and into the front outer gear 512 of the fifth shaft arrangement 500. From the front outer gear 512, power is driven through the front outer shaft 504, through the engaged front clutch 510, through the fifth shaft 502, through the fifth gear 508 of the fifth shaft arrangement 500, and into the rear fourth gear 409 of the fourth shaft arrangement 400. From the rear fourth gear 409, power is driven through the fourth shaft 402, through the front fourth gear 408 of the fourth shaft arrangement 400, and into the front outer gear 612 of the sixth shaft arrangement 600. From the front outer gear 612, power is driven through the front outer shaft 604, through the engaged front clutch 610, through the output shaft 602, and into the load 36.

Prior to the discussion of the power flow paths of Speeds 2 and 3 in Range 1, it should be noted that since the same clutches of the range section 56 (i.e., rear clutch 314, front clutch 510, and front clutch 610) remain engaged, the power flow path through the range section 56 (i.e., the power flow path from the third shaft 302 of the third shaft arrangement 300 to the output shaft 602 of the sixth shaft arrangement 600) of Speeds 2 and 3 is identical to that of Speed 1, as illustrated in FIG. 5. As such, the discussion of Speeds 2 and 3 will mainly focus on the power flow paths from the power source 32 to the third shaft 302 of the third shaft arrangement 300.

Shifting from Speed 1 to Speed 2, the rear clutch 114 of the first shaft arrangement 100 is disengaged, and the front clutch 210 of the second shaft arrangement 200 is engaged. Because the rear clutch 114 of the first shaft arrangement 100 is no longer engaged, rotation of the input shaft 102 no longer affects rotation of the rear outer shaft 106. However, because the front clutch 210 of the second shaft arrangement 200 is now engaged, the second shaft 202 is rotationally fixed to the front outer shaft 204.

As such, in Speed 2, the input section 54 is configured to provide a second forward input speed, such that power is driven from the power source 32, through the input shaft 102, through the first gear 108 of the first shaft arrangement 100, and into the second gear 208 of the second shaft arrangement 200. From the second gear 208, power is driven through the second shaft 202, through the engaged front clutch 210, through the front outer shaft 204, through the front outer gear 212 of the second shaft arrangement 200, and into the front third gear 308 of the third shaft arrangement 300. From the front third gear 308, power is driven into the third shaft 302. Because each clutch within the range section 56 maintains their state of engagement, the range section 56 remains in Range 1, and the power flow path within the range section 56 is identical, from the third shaft 302 to the load 36, as described above, with reference to Speed 1 and as illustrated in FIG. 5.

Shifting from Speed 2 to Speed 3, the front clutch 210 is disengaged and the rear clutch 214 is engaged. Because the front clutch 210 is disengaged, rotation of the second shaft 202 no longer affects the front outer shaft 204. However, because the rear clutch 214 is now engaged, the second shaft 202 is rotationally fixed to the rear outer shaft 206.

As such, in Speed 3, the input section 54 is configured to provide a third forward input speed, such that power is driven from the power source 32, through the input shaft 102, and into the second shaft 202 as described above, with reference to Speed 2. From the second shaft 202, power is driven through the engaged rear clutch 214, through the rear outer shaft 206, through the rear outer gear 216 of the second shaft arrangement 200, and into the rear third gear 309 of the third shaft arrangement 300. From the rear third gear 309, power is driven into the third shaft 302. Again, because each clutch within the range section 56 maintains their state of engagement, the range section 56 remains in Range 1, and the power flow path within the range section 56 is identical, from the third shaft 302 to the load 36, as described above, with reference to Speeds 1 and 2 and as illustrated in FIG. 5.

Shifting from Speed 3 to Speed 4, within the input section 54, the rear clutch 214 of the second shaft arrangement 200 is disengaged and the rear clutch 114 of the first shaft arrangement 100 is engaged. However, shifting from Speed 3 to Speed 4 further comprises shifting from Range 1 to Range 2. As such, shifting from Range 1 to Range 2, within the range section 56, the front clutch 510 of the fifth shaft arrangement 500 is disengaged and the rear clutch 514 of the fifth shaft arrangement 500 is engaged. Therefore, when shifting from Speed 3 to Speed 4, and therefore from Range 1 to Range 2, an overall double-clutch swap is performed, with a single-clutch swap happening within the input section 54 and a single-clutch swap happening within the range section 56 of the transmission 34. Because the front clutch 510 is disengaged, rotation of the front outer shaft 504 no longer affects the fifth shaft 502. However, because the rear clutch 514 is now engaged, the fifth shaft 502 is rotationally fixed to the rear outer shaft 506.

Figure 6:
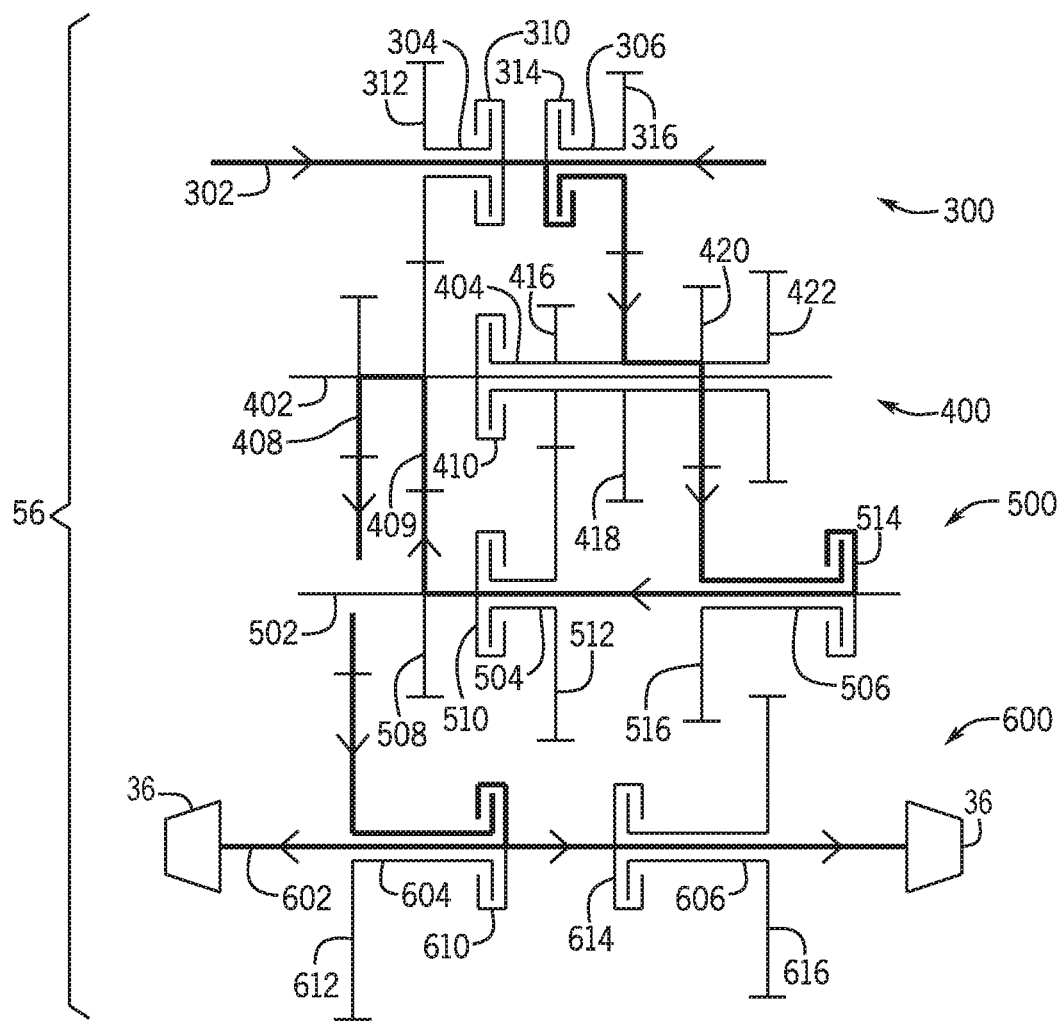
FIG. 6 illustrates a schematic diagram of an embodiment of a range section of the transmission of FIG. 3, showing a power flow path for a second range configuration.

As such, in Speed 4, the input section 54 is again configured to provide the first forward input speed, such that power is driven from the power source 32, through the input section 54, to the third shaft 302 of the third shaft arrangement 300, as described above, with reference to Speed 1. Further, in Speed 4 the range section 56 is in Range 2, which is illustrated in FIG. 6, with the power flow path and directionality of the power flow again denoted by a bolded and arrowed line. As such, from the third shaft 302, in Speed 4, and more generally within the entire Range 2, power is driven through the engaged rear clutch 314, through the rear outer shaft 306, through the rear outer gear 316 of the third shaft arrangement 300, and into the front middle outer gear 418 of the fourth shaft arrangement 400. From the front middle outer gear 418, power is driven through the outer shaft 404, through the rear middle outer gear 420 of the fourth shaft arrangement 400, and into the rear outer gear 516 of the fifth shaft arrangement 500. From the rear outer gear 516, power is driven through the rear outer shaft 506, through the engaged rear clutch 514, through the fifth shaft 502, through the fifth gear 508 of the fifth shaft arrangement 500, and into the rear fourth gear 409 of the fourth shaft arrangement 400. From the rear fourth gear 409, power is driven through the fourth shaft 402, through the front fourth gear 408 of the fourth shaft arrangement 400, and into the front outer gear 612 of the sixth shaft arrangement 600. From the front outer gear 612, power is driven through the front outer shaft 604, through the engaged front clutch 610, through the output shaft 602, and into the load 36.

Shifting from Speed 4 to Speed 5, the rear clutch 114 of the first shaft arrangement 100 is disengaged and the front clutch 210 of the second shaft arrangement 200 is engaged. As such, in Speed 5, the input section 54 is again configured to provide the second forward input speed, such that the power flow path is identical within the input section 54, from the power source 32 to the third shaft 302 of the third shaft arrangement 300, as described above, with reference to Speed 2. Because each clutch within the range section 56 maintains their state of engagement, the range section 56 remains in Range 2, and the power flow path within the range section 56 is identical, from the third shaft 302 to the load 36, as described above, with reference to Speed 4 and as illustrated in FIG. 6.

Shifting from Speed 5 to Speed 6, the front clutch 210 of the second shaft arrangement 200 is disengaged and the rear clutch 214 of the second shaft arrangement 200 is engaged. As such, in Speed 6, the input section 54 is again configured to provide the third forward input speed, such that the power flow path is identical within the input section 54, from the power source 32 to the third shaft 302 of the third shaft arrangement 300, as described above, with respect to Speed 3. Because each clutch within the range section 56 maintains their state of engagement, the range section 56 remains in Range 2, and the power flow path within the range section 56 is identical, from the third shaft 302 to the load 36, as described above, with reference to Speeds 4 and 5 and as illustrated in FIG. 6.

Shifting from Speed 6 to Speed 7, within the input section 54, the rear clutch 214 of the second shaft arrangement 200 is disengaged and the rear clutch 114 of the first shaft arrangement 100 is engaged. However, shifting from Speed 6 to Speed 7 further comprises shifting from Range 2 to Range 3. As such, shifting from Range 2 to Range 3, within the range section 56, the rear clutch 514 of the fifth shaft arrangement 500 is disengaged, and the clutch 410 of the fourth shaft arrangement 400 is engaged. Therefore, when shifting from Speed 6 to Speed 7, and therefore from Range 2 to Range 3, an overall double-clutch swap is again performed, with a single-clutch swap happening within the input section 54 and a single-clutch swap happening within the range section 56 of the transmission 34. Because the rear clutch 514 of the fifth shaft arrangement 500 is disengaged, rotation of the rear outer shaft 506 no longer affects the fifth shaft 502. However, because the clutch 410 of the fourth shaft arrangement 400 is now engaged, the fourth shaft 402 is rotationally fixed to the outer shaft 404.

Figure 7:
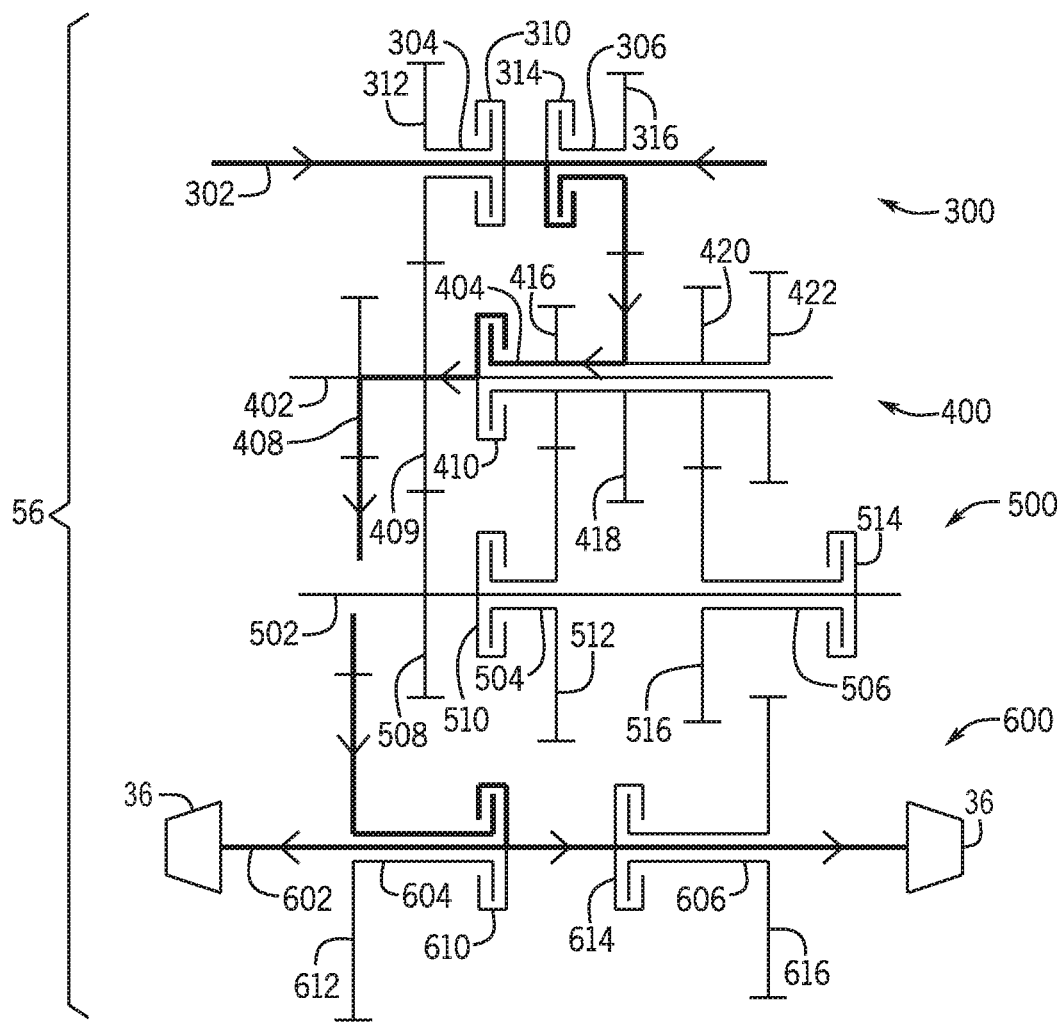
FIG. 7 illustrates a schematic diagram of an embodiment of a range section of the transmission of FIG. 3, showing a power flow path for a third range configuration.

As such, in Speed 7, the input section 54 is again configured to provide the first forward input speed, such that power is driven from the power source 32, through the input section 54, to the third shaft 302 of the third shaft arrangement 300, as described above, with reference to Speeds 1 and 4. Further, in Speed 7 the range section 56 is in Range 3, which is illustrated in FIG. 7, with the power flow path and directionality of the power flow again denoted by a bolded and arrowed line. As such, from the third shaft 302, in Speed 7, and more generally within the entire Range 3, power is driven through the engaged rear clutch 314, through the rear outer shaft 306, through the rear outer gear 316 of the third shaft arrangement 300, and into the front middle outer gear 418 of the fourth shaft arrangement 400. From the front middle outer gear 418, power is driven through the outer shaft 404, through the engaged clutch 410, through the fourth shaft 402, through the front fourth gear 408 of the fourth shaft arrangement 400, and into the front outer gear 612 of the sixth shaft arrangement 600. From the front outer gear 612, power is driven through the front outer shaft 604, through the engaged front clutch 610, through the output shaft 602, to the load 36.

Shifting from Speed 7 to Speed 8, the rear clutch 114 of the first shaft arrangement 100 is disengaged and the front clutch 210 of the second shaft arrangement 200 is engaged. As such, in Speed 8, the input section 54 is again configured to provide the second forward input speed, such that the power flow path is identical within the input section 54, from the power source 32 to the third shaft 302 of the third shaft arrangement 300, as described above, with reference to Speeds 2 and 5. Because each clutch within the range section 56 maintains their state of engagement, the range section 56 remains in Range 3, and the power flow path within the range section 56 is identical, from the third shaft 302 to the load 36, as described above, with reference to Speed 7 and as illustrated in FIG. 7.

Shifting from Speed 8 to Speed 9, the front clutch 210 of the second shaft arrangement 200 is disengaged and the rear clutch 214 of the second shaft arrangement 200 is engaged. As such, in Speed 9, the input section 54 is again configured to provide the third forward input speed, such that the power flow path is identical within the input section 54, from the power source 32 to the third shaft 302 of the third shaft arrangement 300, as described above, with respect Speeds 3 and 6. Again, because each clutch within the range section 56 maintains their state of engagement, the range section 56 remains in Range 3, and the power flow path within the range section 56 is identical, from the third shaft 302 to the load 36, as described above, with reference to Speeds 7 and 8 and as illustrated in FIG. 7.

Shifting from Speed 9 to Speed 10, within the input section 54, the rear clutch 214 of the second shaft arrangement 200 is disengaged and the rear clutch 114 of the first shaft arrangement 100 is engaged. However, shifting from Speed 9 to Speed 10 further comprises shifting from Range 3 to Range 4. As such, shifting from Range 3 to Range 4, within the range section 56, the clutch 410 of the fourth shaft arrangement 400 is disengaged, and the front clutch 310 of the third shaft arrangement 300 is engaged. Therefore, when shifting from Speed 9 to Speed 10, and therefore from Range 3 to Range 4, an overall double-clutch swap is again performed, with a single-clutch swap happening within the input section 54 and a single-clutch swap happening within the range section 56 of the transmission 34. Because the clutch 410 of the fourth shaft arrangement 400 is disengaged, rotation of the outer shaft 404 no longer affects the fourth shaft 402. However, because the front clutch 310 is now engaged, the third shaft 302 is rotationally fixed to the front outer shaft 304.

Figure 8:
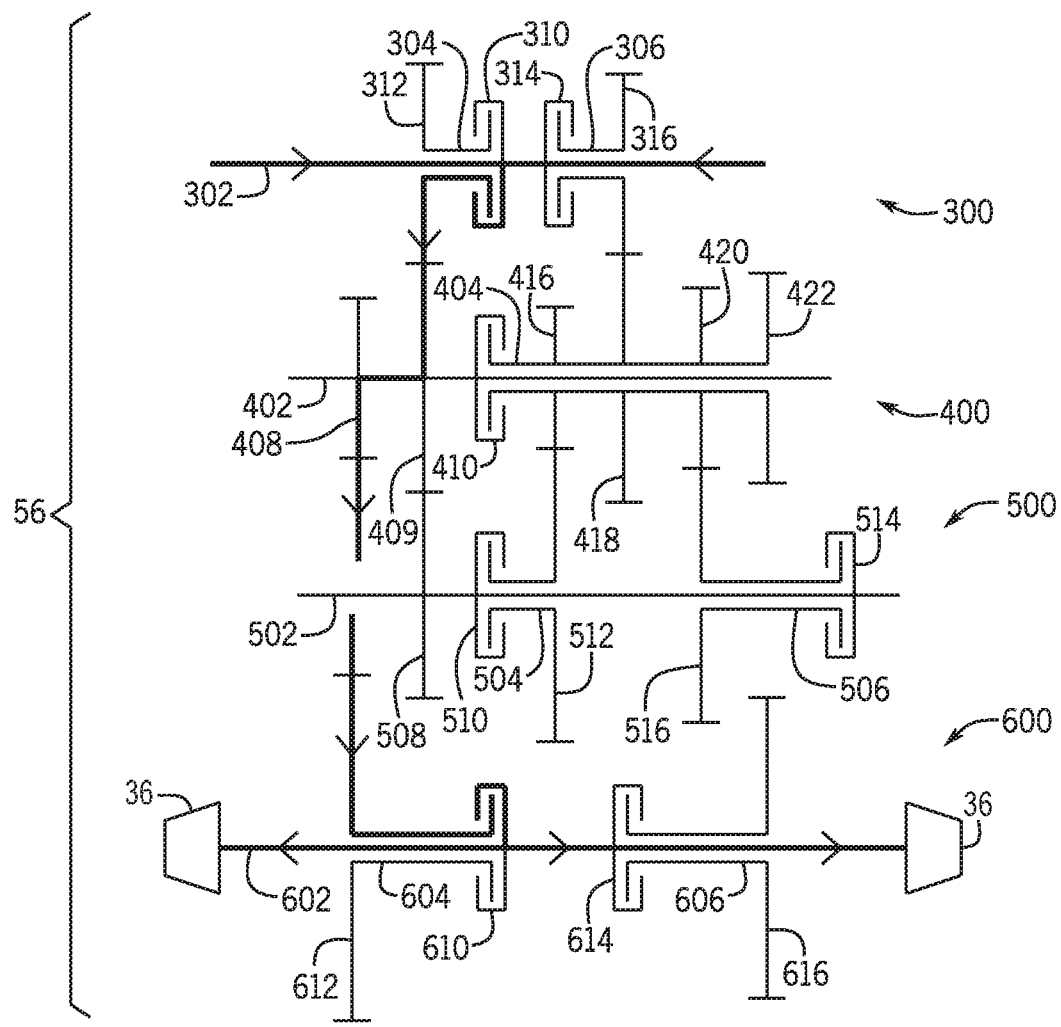
FIG. 8 illustrates a schematic diagram of an embodiment of a range section of the transmission of FIG. 3, showing a power flow path for a fourth range configuration.

As such, in Speed 10, the input section 54 is again configured to provide the first forward input speed, such that power is driven from the power source 32, through the input section 54, to the third shaft 302 of the third shaft arrangement 300, as described above, with reference to Speeds 1, 4, and 7. Further, in Speed 10 the range section 56 is in Range 4, which is illustrated in FIG. 8, with the power flow path and directionality of the power flow again denoted by a bolded and arrowed line. As such, from the third shaft 302, in Speed 10, and more generally within the entire Range 4, power is driven through the engaged front clutch 310, through the front outer shaft 304, through the front outer gear 312 of the third shaft arrangement 300, and into the rear fourth gear 409 of the fourth shaft arrangement 400. From the rear fourth gear 409, power is driven through the front shaft 402, through the front fourth gear 408 of the fourth shaft arrangement 400, and into the front outer gear 612 of the sixth shaft arrangement 600. From the front outer gear 612, power is driven through the front outer shaft 604, through the engaged front clutch 610, through the output shaft 602, to the load 36.

It should be noted that, in Range 4, the rear clutch 314 of the third shaft arrangement 300 is designated with an "O" in the shift diagram, signifying that it may be optionally engaged or disengaged, as desired. As the rear clutch 314 rotationally fixes the third shaft 302 to the rear outer shaft 306, rotation of the third shaft 302 rotates the rear outer shaft 306, thereby rotating the rear outer gear 316 of the third shaft arrangement 300. The rear outer gear 316 then drives the front middle outer gear 418 of the fourth shaft arrangement 400 to rotate, thereby rotating the outer shaft 404. However, because the clutch 410 is not engaged, the rotation of the outer shaft 404 does not affect fourth shaft 402, thereby not affecting the power flow path of the transmission 34. As such, the rear clutch 314 of the third shaft arrangement 300 can be optionally engaged or disengaged, as desired. In some instances, it may be beneficial to leave the rear clutch 314 of the third shaft arrangement 300 engaged while shifting into and out of Range 4 (i.e., upshifting from Speed 9 to Speed 10 and downshifting from Speed 13 to Speed 12), as the rear clutch 314 is engaged in both adjacent ranges, Ranges 3 and 5. As such, leaving the rear clutch 314 engaged prevents unnecessary disengagement/reengagement, which may, for example, reduce overall wear within the transmission 34.

Shifting from Speed 10 to Speed 11, the rear clutch 114 of the first shaft arrangement 100 is disengaged and the front clutch 210 of the second shaft arrangement 200 is engaged. As such, in Speed 11, the input section 54 is again configured to provide the second forward input speed, such that the power flow path is identical within the input section 54, from the power source 32 to the third shaft 302 of the third shaft arrangement 300, as described above, with reference to Speeds 2, 5, and 8. Because each clutch within the range section 56 maintains their state of engagement, the range section 56 remains in Range 4, and the power flow path within the range section 56 is identical, from the third shaft 302 to the load 36, as described above, with reference to Speed 10 and as illustrated in FIG. 8.

Shifting from Speed 11 to Speed 12, the front clutch 210 of the second shaft arrangement 200 is disengaged and the rear clutch 214 of the second shaft arrangement 200 is engaged. As such, in Speed 12, the input section 54 is again configured to provide the third forward input speed, such that the power flow path is identical within the input section 54, from the power source 32 to the third shaft 302 of the third shaft arrangement 300, as described above, with respect Speeds 3, 6, and 9. Again, because each clutch within the range section 56 maintains their state of engagement, the range section 56 remains in Range 4, and the power flow path within the range section 56 is identical, from the third shaft 302 to the load 36, as described above, with reference to Speeds 10 and 11 and as illustrated in FIG. 8.

Shifting from Speed 12 to Speed 13, within the input section 54, the rear clutch 214 of the second shaft arrangement 200 is disengaged and the rear clutch 114 of the first shaft arrangement 100 is engaged. However, shifting from Speed 12 to Speed 13 further comprises shifting from Range 4 to Range 5. As such, shifting from Range 4 to Range 5, within the range section 56, the front clutch 610 of the sixth shaft arrangement 600 is disengaged, and the rear clutch 614 of the sixth shaft arrangement 600 is engaged. Therefore, when shifting from Speed 12 to Speed 13, and therefore from Range 4 to Range 5, an overall double-clutch swap is again performed, with a single-clutch swap happening within the input section 54 and a single-clutch swap happening within the range section 56 of the transmission 34. However, in the instance that the rear clutch 314 of the third shaft arrangement 300 was disengaged while the transmission 34 was in Range 4, the rear clutch 314 is engaged prior to shifting from Range 4 to Range 5. As described above, in many instances, it may be beneficial for the rear clutch 314 to remain engaged while the transmission 34 is in Range 4, to avoid this additional step of engaging and disengaging the rear clutch 314, which may, for example, reduce overall wear within the transmission 34.

Because the front clutch 610 of the sixth shaft arrangement 600 is disengaged, rotation of the front outer shaft 604 no longer affects the output shaft 602. However, because the rear clutch 614 of the sixth shaft arrangement 600 is now engaged, the output shaft 602 is rotationally fixed to the rear outer shaft 606. Similarly, because the rear clutch 314 of the third shaft arrangement 300 is engaged, the third shaft 302 is rotationally fixed to the rear outer shaft 306.

Figure 9:
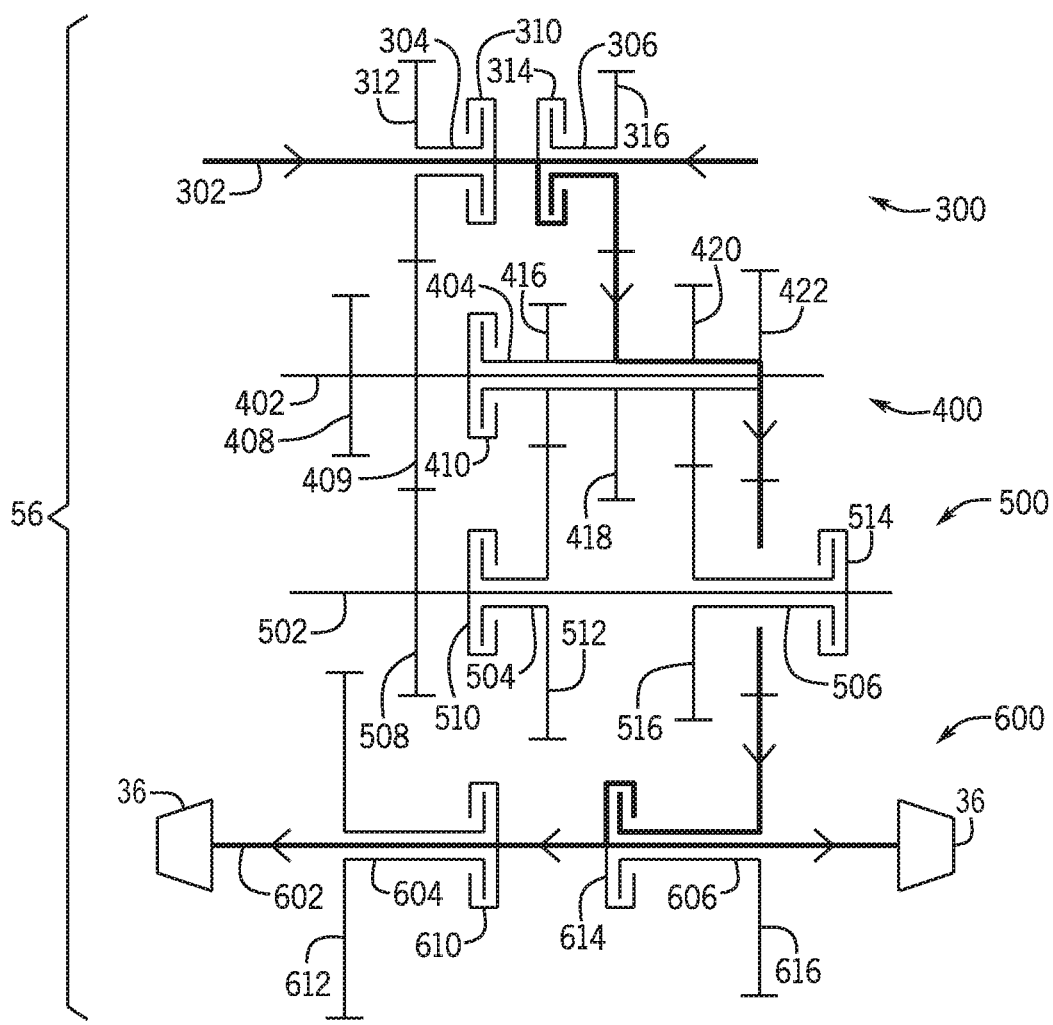
FIG. 9 illustrates a schematic diagram of an embodiment of a range section of the transmission of FIG. 3, showing a power flow path for a fifth range configuration.

As such, in Speed 13, the input section 54 is again configured to provide the first forward input speed, such that power is driven from the power source 32, through the input section 54, to the third shaft 302 of the third shaft arrangement 300, as described above, with reference to Speeds 1, 4, 7, and 10. Further, in Speed 13 the range section 56 is in Range 5, which is illustrated in FIG. 9, with the power flow path and directionality of the power flow again denoted by a bolded and arrowed line. As such, from the third shaft 302, in Speed 13, and more generally within the entire Range 5, power is driven through the engaged rear clutch 314, through the rear outer shaft 306, through the rear outer gear 316 of the third shaft arrangement 300, and into the front middle outer gear 418 of the fourth shaft arrangement 400. From the front middle outer gear 418, power is driven through the outer shaft 404, through the rear outer gear 422 of the fourth shaft arrangement 400, and into the rear outer gear 616 of the sixth shaft arrangement 600. From the rear outer gear 616, power is driven through the rear outer shaft 606, through the engaged rear clutch 614, through the output shaft 602, and into the load 36.

It should again be noted that, in Range 5, the front clutch 310 of the third shaft arrangement 300 is designated with an "O" in the shift diagram, signifying that it may be optionally engaged or disengaged, as desired. As the front clutch 310 rotationally fixes the third shaft 302 to the front outer shaft 304, rotation of the third shaft 302 rotates the front outer shaft 304, thereby rotating the front outer gear 312 of the third shaft arrangement 300. The front outer gear 312 of the third shaft arrangement 300 then drives the rear fourth gear 409 of the fourth shaft arrangement 400, thereby rotating the fourth shaft 402. The fourth shaft 402 then rotates the front fourth gear 408 of the fourth shaft arrangement 400, thereby driving the front outer gear 612 and front outer shaft 604 of the sixth shaft arrangement 600. However, because the front clutch 610 of the sixth shaft arrangement 600 is not engaged, rotation of the front outer shaft 604 does not affect the rotation of the output shaft 602.

Further, the rear fourth gear 409 of the fourth shaft arrangement 400 drives the fifth gear 508 of the fifth shaft arrangement 500, thereby rotating the fifth shaft 502. However, because neither of the front clutch 510 and the rear clutch 514 are engaged, rotation of the fifth shaft 502 does not affect the rotation of either the front outer shaft 504 or the rear outer shaft 506, and thereby does not affect the power flow path of the transmission 34. As such, the front clutch 310 of the third shaft arrangement 300 can be optionally engaged or disengaged, as desired. In some instances, it may be beneficial to leave the front clutch 310 of the third shaft arrangement 300 engaged while shifting into and out of Range 5 (i.e., upshifting from Speed 12 to Speed 13 and downshifting from Speed 16 to Speed 15), as the front clutch 310 is engaged in both adjacent ranges, Ranges 4 and 6. As such, leaving the front clutch 310 engaged prevents unnecessary disengagement/reengagement, which may, for example, reduce overall wear within the transmission 34.

Shifting from Speed 13 to Speed 14, the rear clutch 114 of the first shaft arrangement 100 is disengaged and the front clutch 210 of the second shaft arrangement 200 is engaged. As such, in Speed 14, the input section 54 is again configured to provide the second forward input speed, such that the power flow path is identical within the input section 54, from the power source 32 to the third shaft 302 of the third shaft arrangement 300, as described above, with reference to Speeds 2, 5, 8, and 11. Because each clutch within the range section 56 maintains their state of engagement, the range section 56 remains in Range 5, and the power flow path within the range section 56 is identical, from the third shaft 302 to the load 36, as described above, with reference to Speed 13 and as illustrated in FIG. 9.

Shifting from Speed 14 to Speed 15, the front clutch 210 of the second shaft arrangement 200 is disengaged and the rear clutch 214 of the second shaft arrangement 200 is engaged. As such, in Speed 15, the input section 54 is again configured to provide the third forward input speed, such that the power flow path is identical within the input section 54, from the power source 32 to the third shaft 302 of the third shaft arrangement 300, as described above, with respect Speeds 3, 6, 9, and 12. Again, because each clutch within the range section 56 maintains their state of engagement, the range section 56 remains in Range 5, and the power flow path within the range section 56 is identical, from the third shaft 302 to the load 36, as described above, with reference to Speeds 13 and 14 and as illustrated in FIG. 9.

Shifting from Speed 15 to Speed 16, within the input section 54, the rear clutch 214 of the second shaft arrangement 200 is disengaged and the rear clutch 114 of the first shaft arrangement 100 is engaged. However, shifting from Speed 15 to 16 further comprises shifting from Range 5 to Range 6. As such, shifting from Range 5 to Range 6, within the range section 56, the rear clutch 314 of the third shaft arrangement 300 is disengaged and the clutch 410 of the fourth shaft arrangement 400 is engaged. Therefore, when shifting from Speed 15 to Speed 16, and therefore from Range 5 to Range 6, an overall double-clutch swap is again performed, with a single-clutch swap happening within the input section 54 and a single-clutch swap happening within the range section 56 of the transmission 34. However, in the instance that the front clutch 310 of the third shaft arrangement 300 was disengaged while the transmission 34 was in Range 5, the front clutch 310 is engaged prior to shifting from Range 5 to Range 6. As described above, in many instances, it may be beneficial for the front clutch 310 to remain engaged while the transmission 34 is in Range 5. Because the rear clutch 314 of the third shaft arrangement 300 is disengaged, rotation of the third shaft 302 does not affect the rear outer shaft 306. However, because the clutch 410 is now engaged, the fourth shaft 402 is rotationally fixed to the outer shaft 404. Similarly, because the front clutch 310 of the third shaft arrangement 300 is engaged, the third shaft 302 is rotationally fixed to the front outer shaft 304.

Figure 10:
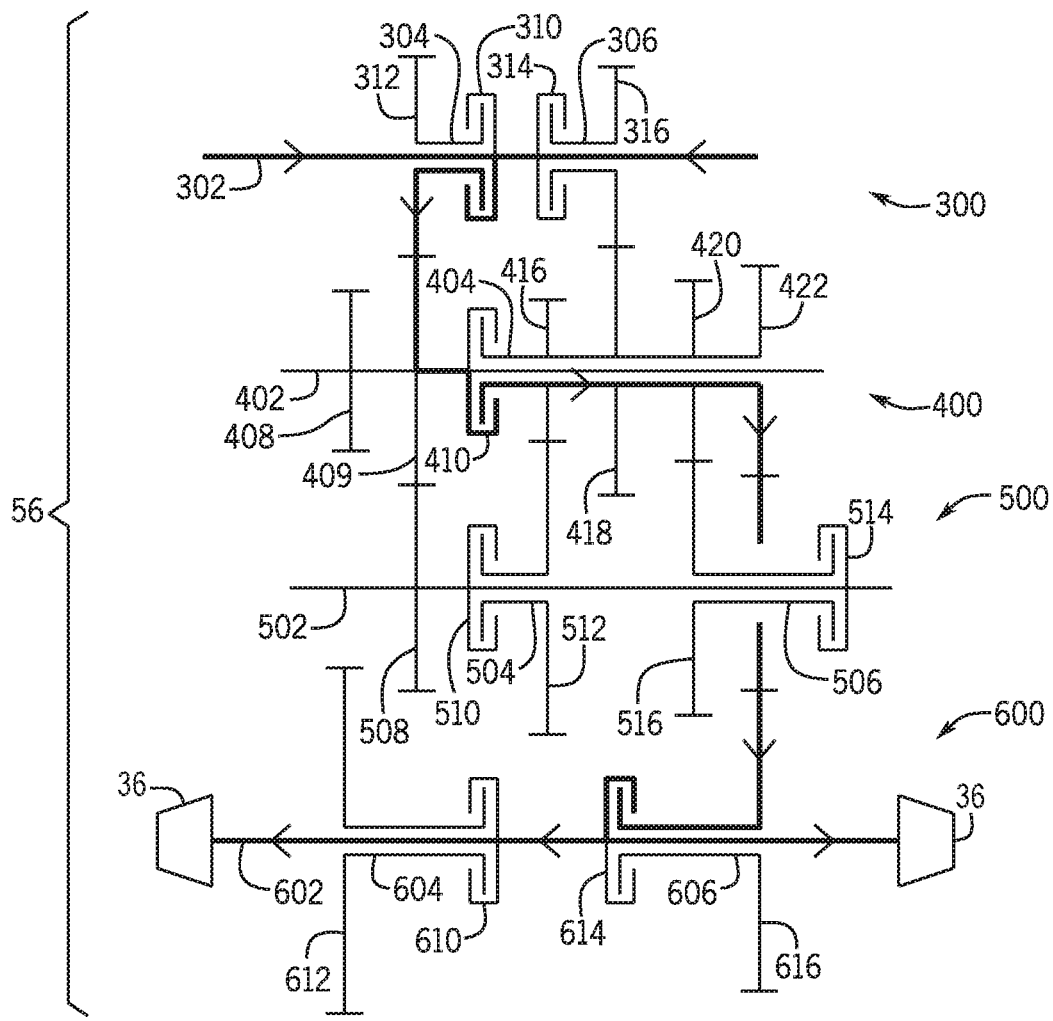
FIG. 10 illustrates a schematic diagram of an embodiment of a range section of the transmission of FIG. 3, showing a power flow path for a sixth range configuration.

As such, in Speed 16, the input section 54 is again configured to provide the first forward input speed, such that power is driven from the power source 32, through the input section 54, to the third shaft 302 of the third shaft arrangement 300, as described above, with reference to Speeds 1, 4, 7, 10, and 13. Further, in Speed 16 the range section 56 is in Range 6, which is illustrated in FIG. 10, with the power flow path and directionality of the power flow again denoted by a bolded and arrowed line. As such, from the third shaft 302, in Speed 16, and more generally within the entire Range 6, power is driven through the engaged front clutch 310, through the front outer shaft 304, through the front outer gear 312 of the third shaft arrangement 300, and into the rear fourth gear 409 of the fourth shaft arrangement 400. From the rear fourth gear 409, power is driven through the fourth shaft 402, through the engaged clutch 410, through the outer shaft 404, through the rear outer gear 422 of the fourth shaft arrangement 400, and into the rear outer gear 616 of the sixth shaft arrangement 600. From the rear outer gear 616, power is driven through the rear outer shaft 606, through the engaged rear clutch 614, through the output shaft 602, and into the load 36.

Shifting from Speed 16 to Speed 17, the rear clutch 114 of the first shaft arrangement 100 is disengaged and the front clutch 210 of the second shaft arrangement 200 is engaged. As such, in Speed 17, the input section 54 is again configured to provide the second forward input speed, such that the power flow path is identical within the input section 54, from the power source 32 to the third shaft 302 of the third shaft arrangement 300, as described above, with reference to Speeds 2, 5, 8, 11, and 14. Because each clutch within the range section 56 maintains their state of engagement, the range section 56 remains in Range 6, and the power flow path within the range section 56 is identical, from the third shaft 302 to the load 36, as described above, with reference to Speed 16 and as illustrated in FIG. 10.

Shifting from Speed 17 to Speed 18, the front clutch 210 of the second shaft arrangement 200 is disengaged and the rear clutch 214 of the second shaft arrangement 200 is engaged. As such, in Speed 18, the input section 54 is again configured to provide the third forward input speed, such that the power flow path is identical within the input section 54, from the power source 32 to the third shaft 302 of the third shaft arrangement 300, as described above, with respect Speeds 3, 6, 9, 12, and 15. Again, because each clutch within the range section 56 maintains their state of engagement, the range section 56 remains in Range 6, and the power flow path within the range section 56 is identical, from the third shaft 302 to the load 36, as described above, with reference to Speeds 16 and 17 and as illustrated in FIG. 10.

Shifting from Speed 18 to 19, within the input section 54, the rear clutch 214 of the second shaft arrangement 200 is disengaged and the rear clutch 114 of the first shaft arrangement 100 is engaged. However, shifting from Speed 18 to 19 further comprises shifting from Range 6 to Range 7. As such, shifting from Range 6 to Range 7, within the range section 56, the clutch 410 of the fourth shaft arrangement 400 is disengaged and the rear clutch 514 of the fifth shaft arrangement is engaged. Therefore, when shifting from Speed 18 to Speed 19, and therefore from Range 6 to Range 7, an overall double-clutch swap is again performed, with a single-clutch swap happening within the input section 54 and a single-clutch swap happening within the range section 56 of the transmission 34. Because the clutch 410 is disengaged, rotation of the fourth shaft 402 does not affect the outer shaft 404. However, because the rear clutch 514 is now engaged, the fifth shaft 502 is rotationally fixed to the rear outer shaft 506.

Figure 11:
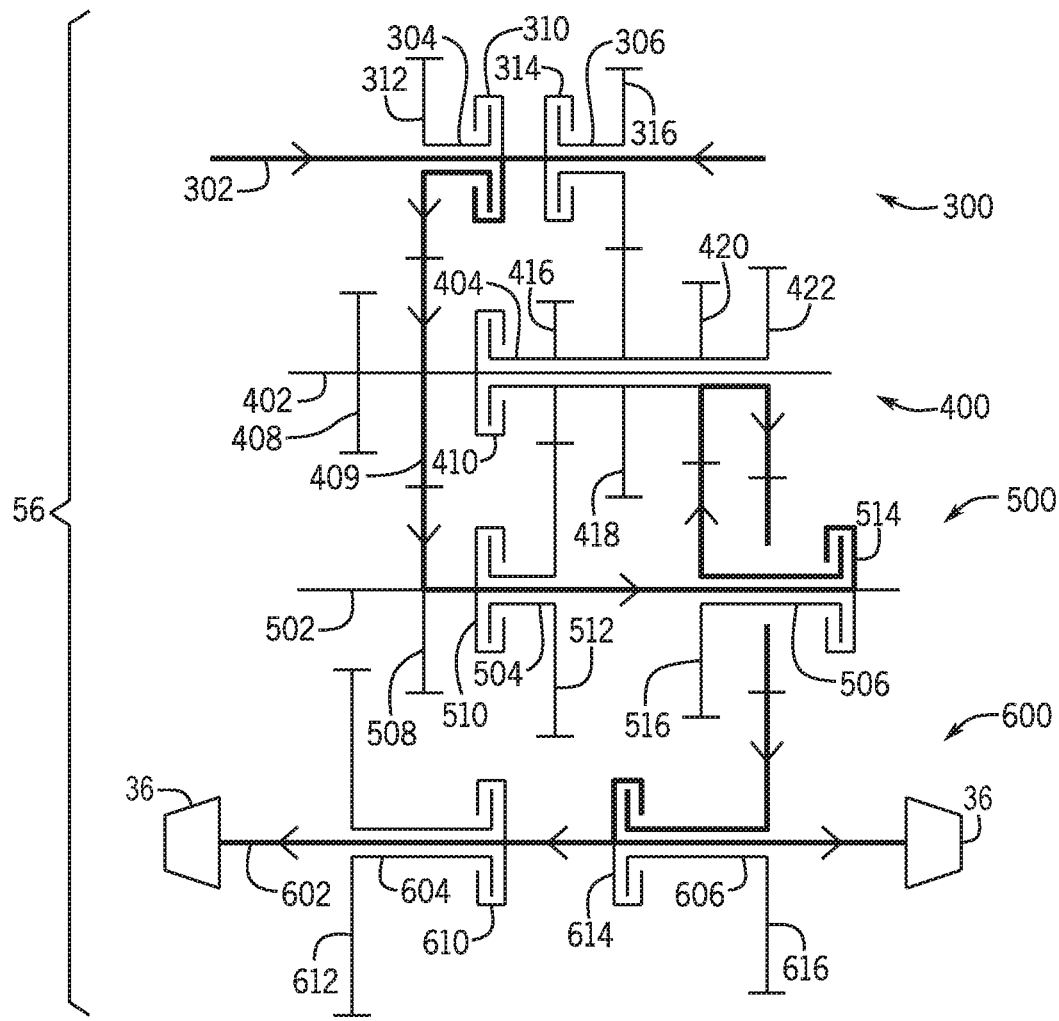
FIG. 11 illustrates a schematic diagram of an embodiment of a range section of the transmission of FIG. 3, showing a power flow path for a seventh configuration.

As such, in Speed 19, the input section 54 is again configured to provide the first forward input speed, such that power is driven from the power source 32, through the input section 54, to the third shaft 302 of the third shaft arrangement 300, as described above, with reference to Speeds 1, 4, 7, 10, 13, and 16. Further, in Speed 19 the range section 56 is in Range 7, which is illustrated in FIG. 11, with the power flow path and directionality of the power flow again denoted by a bolded and arrowed line. As such, from the third shaft 302, in Speed 19, and more generally within the entire Range 7, power is driven through the engaged front clutch 310, through the front outer shaft 304, through the front outer gear 312 of the third shaft arrangement 300, and into the rear fourth gear 409 of the fourth shaft arrangement 400. From the rear fourth gear 409 of the fourth shaft arrangement 400, power is driven into the fifth gear 508 of the fifth shaft arrangement 500. From the fifth gear 508, power is driven through the fifth shaft 502, through the engaged rear clutch 514, through the rear outer shaft 506, through the rear outer gear 516 of the fifth shaft arrangement 500, back into the rear middle outer gear 420 of the fourth shaft arrangement 400. From the rear middle outer gear 420, power is driven through the outer shaft 404, through the rear outer gear 422 of the fourth shaft arrangement 400, into the rear outer gear 616 of the sixth shaft arrangement 600. From the rear outer gear 616, power is driven through the rear outer shaft 606, through the engaged rear clutch 614, through the output shaft 602, and into the load 36.

Shifting from Speed 19 to Speed 20, the rear clutch 114 of the first shaft arrangement 100 is disengaged and the front clutch 210 of the second shaft arrangement 200 is engaged. As such, in Speed 20, the input section 54 is again configured to provide the second forward input speed, such that the power flow path is identical within the input section 54, from the power source 32 to the third shaft 302 of the third shaft arrangement 300, as described above, with reference to Speeds 2, 5, 8, 11, 14, and 17. Because each clutch within the range section 56 maintains their state of engagement, the range section 56 remains in Range 7, and the power flow path within the range section 56 is identical, from the third shaft 302 to the load 36, as described above, with reference to Speed 19 and as illustrated in FIG. 11.

Shifting from Speed 20 to Speed 21, the front clutch 210 of the second shaft arrangement 200 is disengaged and the rear clutch 214 of the second shaft arrangement 200 is engaged. As such, in Speed 21, the input section 54 is again configured to provide the third forward input speed, such that the power flow path is identical within the input section 54, from the power source 32 to the third shaft 302 of the third shaft arrangement 300, as described above, with respect Speeds 3, 6, 9, 12, 15, and 18. Again, because each clutch within the range section 56 maintains their state of engagement, the range section 56 remains in Range 7, and the power flow path within the range section 56 is identical, from the third shaft 302 to the load 36, as described above, with reference to Speeds 19 and 20 and as illustrated in FIG. 11.

Shifting from Speed 21 to Speed 22, within the input section 54, the rear clutch 214 of the second shaft arrangement 200 is disengaged and the rear clutch 114 of the first shaft arrangement 100 is engaged. However, shifting from Speed 21 to 22 further comprises shifting from Range 7 to Range 8. As such, shifting from Range 7 to Range 8, within the range section 56, the rear clutch 514 of the fifth shaft arrangement 500 is disengaged and the front clutch 510 of the fifth shaft arrangement 500 is engaged. Therefore, when shifting from Speed 21 to Speed 22, and therefore from Range 7 to Range 8, an overall double-clutch swap is again performed, with a single-clutch swap happening within the input section 54 and a single-clutch swap happening within the range section 56 of the transmission 34. Because the rear clutch 514 is disengaged, rotation of the rear outer shaft 506 does not affect the fifth shaft 502. However, because the front clutch 510 is engaged, the fifth shaft 502 is rotationally fixed to the front outer shaft 504.

Figure 12:
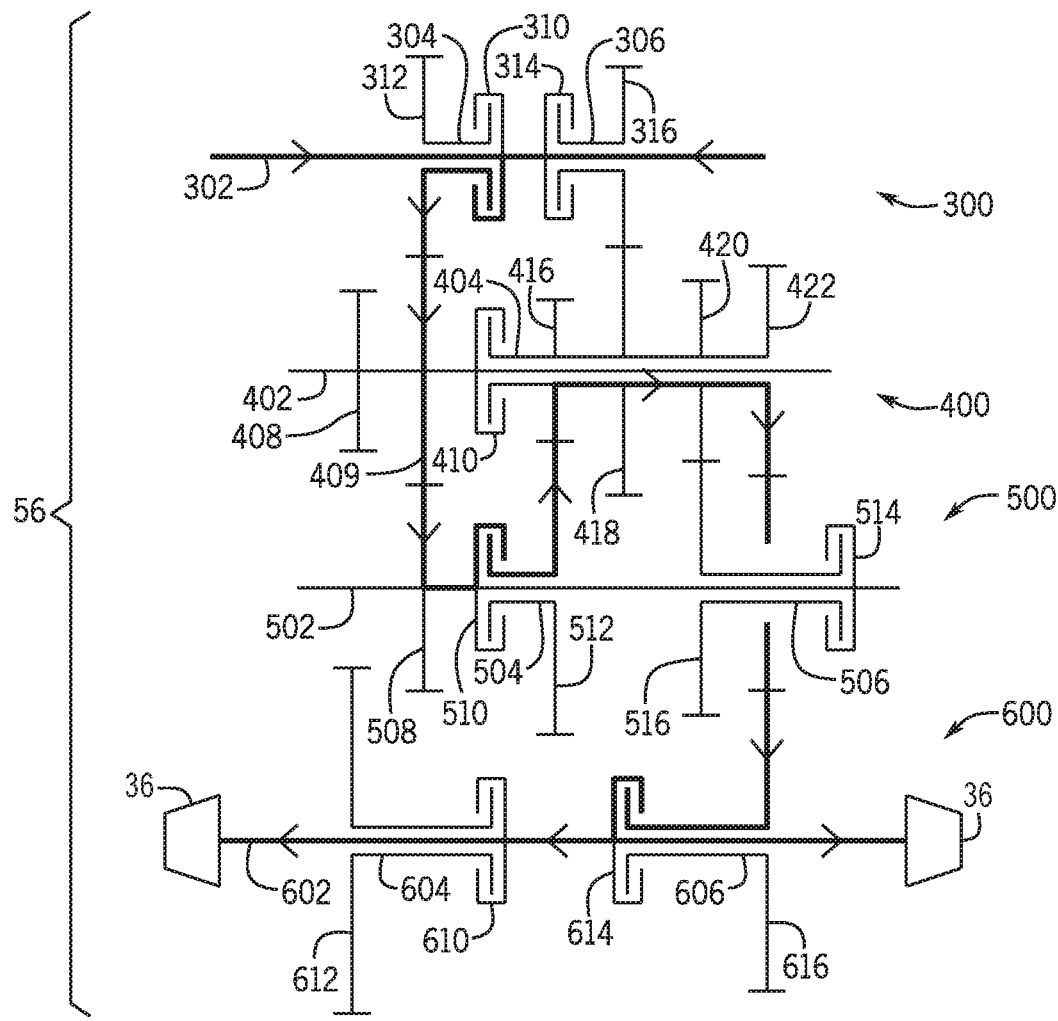
FIG. 12 illustrates a schematic diagram of an embodiment of a range section of the transmission of FIG. 3, showing a power flow path for an eighth range configuration.

As such, in Speed 22, the input section 54 is again configured to provide the first forward input speed, such that power is driven from the power source 32, through the input section 54, to the third shaft 302 of the third shaft arrangement 300, as described above, with reference to Speeds 1, 4, 7, 10, 13, 16, and 19. Further, in Speed 22 the range section 56 is in Range 8, which is illustrated in FIG. 12, with the power flow path and directionality of the power flow again denoted by a bolded and arrowed line. As such, from the third shaft 302, in Speed 22, and more generally within the entire Range 8, power is driven through the engaged front clutch 310, through the front outer shaft 304, through the front outer gear 312 of the third shaft arrangement 300, and into the rear fourth gear 409 of the fourth shaft arrangement 400. From the rear fourth gear 409 of the fourth shaft arrangement 400, power is driven into the fifth gear 508 of the fifth shaft arrangement 500. From the fifth gear 508, power is driven through the fifth shaft 502, through the engaged front clutch 510, through the front outer shaft 504, through the front outer gear 512 of the fifth shaft arrangement 500, back into the front outer gear 416 of the fourth shaft arrangement 400. From the front outer gear 416, power is driven through the outer shaft 404, through the rear outer gear 422 of the fourth shaft arrangement 400, into the rear outer gear 616 of the sixth shaft arrangement 600. From the rear outer gear 616, power is driven through the rear outer shaft 606, through the engaged rear clutch 614, through the output shaft 602, and into the load 36.

It should be noted that, within the range section 56, when shifting up from Range 1 to Range 2 (i.e., from the lowest speed range to the second lowest speed range), the front clutch 510 of the fifth shaft arrangement 500 is disengaged, and the rear clutch 514 of the fifth shaft arrangement 500 is engaged. Further, when shifting down from Range 8 to Range 7 (i.e., from the highest speed range to the second highest speed range), the front clutch 510 of the fifth shaft arrangement 500 is similarly disengaged, and the rear clutch 514 of the fifth shaft arrangement 500 is similarly engaged. As such, power is configured to flow through the front clutch 510 and the rear clutch 514 in a first direction in the lowest speed range and the second lowest speed range, respectively, and power is configured to flow through the front clutch 510 and the rear clutch 514 in a second direction, opposite the first direction, in the highest speed range and the second highest speed range, respectively.

Shifting from Speed 22 to Speed 23, the rear clutch 114 of the first shaft arrangement 100 is disengaged and the front clutch 210 of the second shaft arrangement 200 is engaged. As such, in Speed 23, the input section 54 is again configured to provide the second forward input speed, such that the power flow path is identical within the input section 54, from the power source 32 to the third shaft 302 of the third shaft arrangement 300, as described above, with reference to Speeds 2, 5, 8, 11, 14, 17, and 20. Because each clutch within the range section 56 maintains their state of engagement, the range section 56 remains in Range 8, and the power flow path within the range section 56 is identical, from the third shaft 302 to the load 36, as described above, with reference to Speed 22 and as illustrated in FIG. 12.

Shifting from Speed 23 to Speed 24, the front clutch 210 of the second shaft arrangement 200 is disengaged and the rear clutch 214 of the second shaft arrangement 200 is engaged. As such, in Speed 24, the input section 54 is again configured to provide the third forward input speed, such that the power flow path is identical within the input section 54, from the power source 32 to the third shaft 302 of the third shaft arrangement 300, as described above, with respect Speeds 3, 6, 9, 12, 15, 18, and 21. Again, because each clutch within the range section 56 maintains their state of engagement, the range section 56 remains in Range 8, and the power flow path within the range section 56 is identical, from the third shaft 302 to the load 36, as described above, with reference to Speeds 22 and 23 and as illustrated in FIG. 12.

With the twenty four forward speeds discussed above, a description of the eight reverse speeds, Speeds R1 through R8, will be discussed below.

Specifically, shifting from Speed 1 to Speed R1, within the input section 54, the rear clutch 114 of the first shaft arrangement 100 is disengaged and the front clutch 110 of the first shaft arrangement 100 is engaged. As such, in Speed R1, the input section 52 is configured to provide the reverse input speed, such that power is driven from the power source 32, through the input shaft or input shaft 102, through the engaged front clutch 110, through the front outer shaft 104, through the front outer gear 112 of the first shaft arrangement 100, and into the front third gear 308 of the third shaft arrangement 300. Because each clutch within the range section 56 maintains their state of engagement, the range section 56 remains in Range 1, and the power flow path within the range section 56 is identical, from the third shaft 302 to the load 36, to that of Range 1 as described above, with reference to any of Speeds 1, 2, and 3 and as illustrated in FIG. 5.

Shifting from Speed R1 to R2, each of the clutches within the input section 54 maintains their state of engagement. As such, the power flow path within the input section 54 is identical, from the power source 32 to the third shaft 302, as described above, with reference to Speed R1. Further, within the range section 56, the front clutch 510 of the fifth shaft arrangement 500 is disengaged, and the rear clutch 514 of the fifth shaft arrangement 500 is engaged. This configuration of engaged clutches is the Range 2 configuration described above. As such, the power flow path is identical within the range section 56, from the third shaft 302 to the load 36, as described above with reference to any of Speeds 4, 5, and 6 and as illustrated in FIG. 6.

Shifting from Speed R2 to R3, each of the clutches within the input section 54 maintains their state of engagement. As such, the power flow path within the input section 54 is identical, from the power source 32 to the third shaft 302, as described above, with reference to Speeds R1 and R2. Further, within the range section 56, the rear clutch 514 of the fifth shaft arrangement 500 is disengaged, and the clutch 410 of the fourth shaft arrangement 400 is engaged. This configuration of engaged clutches is the Range 3 configuration described above. As such, the power flow path within the range section 56 is identical, from the third shaft 302 to the load 36, as described above with reference to any of Speeds 7, 8, and 9 and as illustrated in FIG. 7.

Shifting from Speed R3 to R4, each of the clutches within the input section 54 maintains their state of engagement. As such, the power flow path within the input section 54 is identical, from the power source 32 to the third shaft 302, as described above, with reference to Speeds R1, R2, and R3. Further, within the range section 56, the clutch 410 of the fourth shaft arrangement 400 is disengaged, and the front clutch 310 of the third shaft arrangement 300 is engaged. This configuration of engaged clutches is the Range 4 configuration described above. As such, the power flow path within the range section 56 is identical, from the third shaft 302 to the load 36, as described above with reference to any of Speeds 10, 11, and 12 and as illustrated in FIG. 8. Similarly, the rear clutch 314 can optionally be engaged or disengaged without affecting the power flow path, as also described above.

Shifting from Speed R4 to R5, each of the clutches within the input section 54 maintains their state of engagement. As such, the power flow path within the input section 54 is identical, from the power source 32 to the third shaft 302, as described above, with reference to Speeds R1, R2, R3, and R4. Further, within the range section 56, the front clutch 610 of the sixth shaft arrangement 600 is disengaged, and the rear clutch 614 of the sixth shaft arrangement 600 is engaged. Additionally, in the case that the rear clutch 314 was disengaged while the transmission was in R4, the rear clutch 314 is engaged. This configuration of engaged clutches is the Range 5 configuration described above. As such, the power flow path within the range section 56 is identical, from the third shaft 302 to the load 36, as described above with reference to any of Speeds 13, 14, and 15 and as illustrated in FIG. 9. Similarly, the front clutch 310 can optionally be engaged or disengaged without affecting the power flow path, as also described above.

Shifting from Speed R5 to R6, each of the clutches within the input section 54 maintains their state of engagement. As such, the power flow path within the input section 54 is identical, from the power source 32 to the third shaft 302, as described above, with reference to Speeds R1, R2, R3, R4, and R5. Further, within the range section 56, the rear clutch 314 of the third shaft arrangement 300 is disengaged, and the clutch 410 of the fourth shaft arrangement 400 is engaged. Additionally, in the case that the front clutch 310 was disengaged while the transmission was in R5, the front clutch 310 is engaged. This configuration of engaged clutches is the Range 6 configuration described above. As such, the power flow path within the range section 56 is identical, from the third shaft 302 to the load 36, as described above with reference to any of Speeds 16, 17, and 18 and as illustrated in FIG. 10.

Shifting from Speed R6 to R7, each of the clutches within the input section 54 maintains their state of engagement. As such, the power flow path within the input section 54 is identical, from the power source 32 to the third shaft 302, as described above, with reference to Speeds R1, R2, R3, R4, R5, and R6. Further, within the range section 56, the clutch 410 of the fourth shaft arrangement 400 is disengaged, and the rear clutch 514 of the fifth shaft arrangement 500 is engaged. This configuration of engaged clutches is the Range 7 configuration described above. As such, the power flow path within the range section 56 is identical, from the third shaft 302 to the load 36, as described above with reference to any of Speeds 19, 20, and 21 and as illustrated in FIG. 11.

Shifting from Speed R7 to R8, each of the clutches within the input section 54 maintains their state of engagement. As such, the power flow path within the input section 54 is identical, from the power source 32 to the third shaft 302, as described above, with reference to Speeds R1, R2, R3, R4, R5, R6, and R7. Further, within the range section 56, the rear clutch 514 of the fifth shaft arrangement 500 is disengaged, and the front clutch 510 of the fifth shaft arrangement 500 is engaged. This configuration of engaged clutches is the Range 8 configuration described above. As such, the power flow path within the range section 56 is identical, from the third shaft 302 to the load 36, as described above with reference to any of Speeds 22, 23, and 24 and as illustrated in FIG. 12.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A transmission system configured to transfer power from a power source to a load on an off-highway vehicle, the transmission system comprising:
   an input section including an input shaft coupled to the power source to transfer power therebetween and a plurality of input clutches configured to selectively transition between an engaged state and a disengaged state to provide one or more input speeds; and
   a range section including an output shaft coupled to the load to transfer power therebetween and a plurality of range clutches configured to selectively transition between the engaged state and the disengaged state to provide one or more speed ranges for each of the one or more input speeds provided by the input section,
   wherein when the range section is commanded to sequentially shift between two of the one or more speed ranges at a given one of the one or more input speeds, the range section is configured to maintain at least two of the plurality of range clutches in the engaged state and transition a maximum of one of the plurality of range clutches from the disengaged state to the engaged state.

2. The transmission system of claim 1, further comprising a controller in communication with the plurality of input clutches and the plurality of range clutches, wherein the controller is configured to selectively transition the plurality of input clutches and the plurality of range clutches between the engaged and disengaged states to establish one of a plurality of gear ratios between the input shaft and the output shaft.

3. The transmission system of claim 1, wherein the range section is configured to provide eight speed ranges for each of the one or more input speeds provided by the input section.

4. The transmission system of claim 3, wherein the input section is configured to provide three input speeds in a forward direction of travel and one input speed in a reverse direction of travel.

5. The transmission system of claim 4, wherein a combination of the eight speed ranges, three input speeds in the forward direction, and one input speed in the reverse direction is configured to provide twenty-four different speeds in the forward direction of travel and eight different speeds in the reverse direction of travel.

6. The transmission system of claim 1, wherein input section comprises at least two input section shafts and at least six input section gears, and the plurality of input clutches comprises at least four input clutches.

7. The transmission system of claim 1, wherein the range section comprises at least four range section shafts and at least fifteen range section gears, and the plurality of range clutches comprises at least seven range section clutches.

8. The transmission system of claim 1, wherein the input section includes a first shaft arrangement and second shaft arrangement, and wherein at least one of the first and second shaft arrangements include the input shaft and at least one of the first and second shaft arrangements are coupled to the range section to transfer power therebetween.

9. The transmission system of claim 8, wherein the range section includes a third shaft arrangement, a fourth shaft arrangement, a fifth shaft arrangement, and a sixth shaft arrangement, and wherein at least one of the third, fourth, fifth, and sixth shaft arrangements are coupled to at least one of the first shaft arrangement and the second shaft arrangement to transfer power therebetween and at least one of the third, fourth, fifth, and sixth shaft arrangements include the output shaft.

10. A transmission system configured to transfer power from a power source to a load on an off-highway vehicle, the transmission system comprising:
    an input section including an input shaft coupled to the power source to transfer power therebetween and a plurality of input clutches configured to selectively transition between an engaged state and a disengaged state to provide one or more input speeds; and
    a range section including an output shaft coupled to the load to transfer power therebetween and a plurality of range clutches configured to selectively transition between the engaged state and the disengaged state to provide one or more speed ranges for each of the one or more input speeds provided by the input section,
    wherein each of the one or more speed ranges provided by the range section include three of the plurality of range clutches in the engaged state and, when the range section is commanded to sequentially shift between two of the one or more speed ranges at a given one of the one or more input speeds, two of the plurality of clutches are maintained in the engaged state.

11. The transmission system of claim 10, further comprising a controller in communication with the plurality of input clutches and the plurality of range clutches, wherein the controller is configured to selectively transition the plurality of input clutches and the plurality of range clutches between the engaged and disengaged states to establish one of a plurality of gear ratios between the input shaft and the output shaft.

12. The transmission system of claim 10, wherein the range section is configured to provide eight speed ranges for each of the one or more input speeds provided by the input section.

13. The transmission system of claim 12, wherein the input section is configured to provide three input speeds in a forward direction of travel and one input speed in a reverse direction of travel.

14. The transmission system of claim 13, wherein a combination of the eight speed ranges, three input speeds in the forward direction, and one input speed in the reverse direction is configured to provide twenty-four different speeds in the forward direction of travel and eight different speeds in the reverse direction of travel.

15. The transmission system of claim 10, wherein input section comprises at least two input section shafts and at least six input section gears, and the plurality of input clutches comprises at least four input clutches.

16. The transmission system of claim 10, wherein the range section comprises at least four range section shafts and at least fifteen range section gears, and the plurality of range clutches comprises at least seven range section clutches.

17. The transmission system of claim 10, wherein when the range section is commanded to sequentially shift between two of the one or more speed ranges at the given one of the one or more input speeds, a maximum of one of the plurality of range clutches is configured to transition from the disengaged state to the engaged state.

18. A range section for a transmission, the range section comprising:
    a range input shaft;
    a range output shaft;

at least two range countershafts configured to transfer power between the range input shaft and the range output shaft; and a plurality of range clutches configured to selectively transition between an engaged state and a disengaged state to provide one or more speed ranges, wherein the plurality of range clutches includes a first countershaft clutch and a second countershaft clutch, and wherein the one or more speed ranges includes a lowest speed range, a second lowest speed range, a highest speed range, and a second highest speed range, wherein each of the one or more speed ranges include three of the plurality of range clutches in the engaged state and, in response to a command to sequentially shift between two of the one or more speed ranges, two of the plurality of clutches are maintained in the engaged state and one of the plurality of clutches is transitioned from the disengaged state to the engaged state, and in response to a command to shift from the lowest speed range to the second lowest speed range, the first countershaft clutch is disengaged and the second countershaft clutch is engaged, and in response to a command to shift from the highest speed range to the second highest speed range, the first countershaft clutch is disengaged and the second countershaft clutch is engaged.

19. The range section of claim 18, wherein the one or more speed ranges include eight speed ranges, and wherein the range input shaft, the range output shaft, and the at least two range countershafts are arranged in a parallel, non-concentric arrangement.

20. The range section of claim 18, wherein power is configured to flow through the first countershaft clutch in a first direction in the lowest speed range, and power is configured to flow through the first countershaft clutch in a second direction opposite to the first direction in the highest speed range.

* * * * *